United States Patent

[11] 3,579,279

| [72] | Inventors | Seiuemon Inaba<br>Kawasaki-shi;<br>Kanryo Shimizu, Tokyo; Yoshihiro<br>Hashimoto, Yokohama-shi; Kengo<br>Kobayashi, Kawasaki-shi, Japan |
|------|-----------|---|
| [21] | Appl. No. | 824,897 |
| [22] | Filed | May 15, 1969 |
| [45] | Patented | May 18, 1971 |
| [73] | Assignee | Fujitsu Limited<br>Kawasaki, Japan |
| [32] | Priority | May 16, 1968 |
| [33] | | Japan |
| [31] | | 43-33240 |

[54] STEP MOTOR ACCELERATION-DECELERATION CONTROL SYSTEM
7 Claims, 29 Drawing Figs.

[52] U.S. Cl. .................................................. 318/696,
318/601, 318/415
[51] Int. Cl. .................................................. H02v 37/00
[50] Field of Search .......................................... 318/138, 7
4, 20.910, 20.0, 415, 601

[56] References Cited
UNITED STATES PATENTS

| 3,328,658 | 6/1967 | Thompson.................... | 318/138 |
| 3,374,410 | 3/1968 | Cronquist et al. ............ | 318/138 |
| 3,411,058 | 11/1968 | Madsen et al................. | 318/138 |
| 3,443,181 | 5/1969 | Kozol et al.................... | 318/138 |
| 3,466,517 | 9/1969 | Leenhouts..................... | 318/138X |
| 3,467,899 | 9/1969 | Inaba et al. ................... | 318/138X |
| 3,475,667 | 10/1969 | Newell .......................... | 318/138 |
| 3,476,996 | 11/1969 | Fredriksen .................... | 318/138 |

Primary Examiner—G. R. Simmons
Attorneys—Curt M. Avery, Arthur E. Wilfond, Herbert L. Lerner and Daniel J. Tick ABSTRACT: A pulse control circuit is connected between the pulse supply for supplying a train of control pulses to a step motor and the motor. The pulse control circuit gradually increases the frequency of pulses in the beginning of the pulse train and gradually decreases the frequency of pulses in the end of the pulse train thereby enabling proper starting and stopping of a motor operating at high speed.

Patented May 18, 1971

Patented May 18, 1971

FIG.9A        FIG.9B
    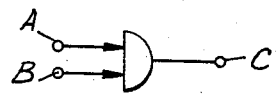

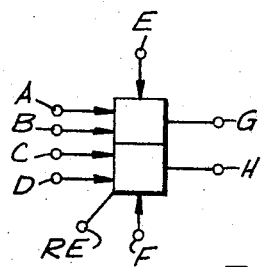    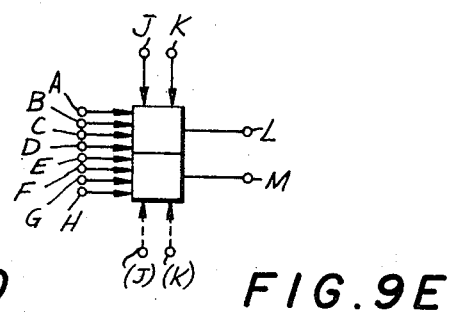
FIG.9D        FIG.9E
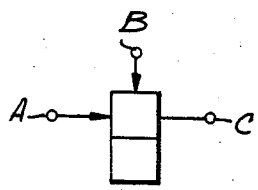
FIG.9F

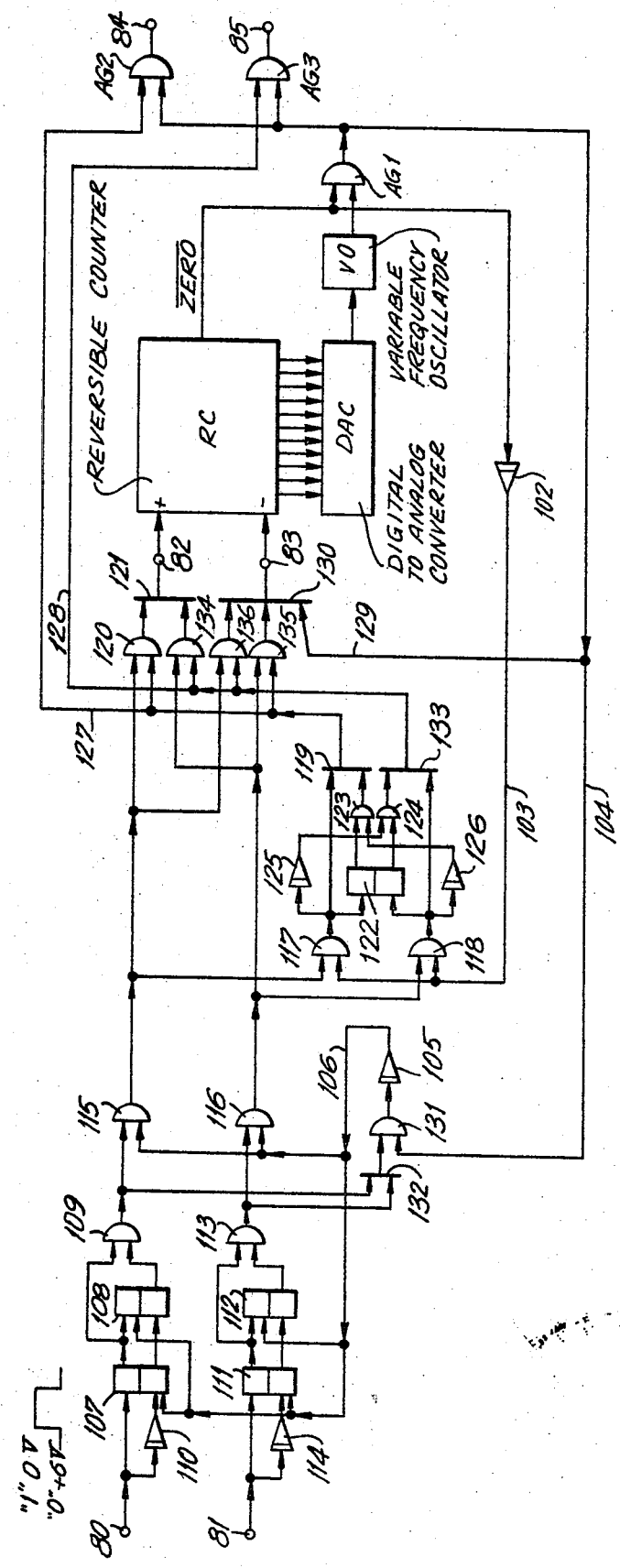

FIG. 17
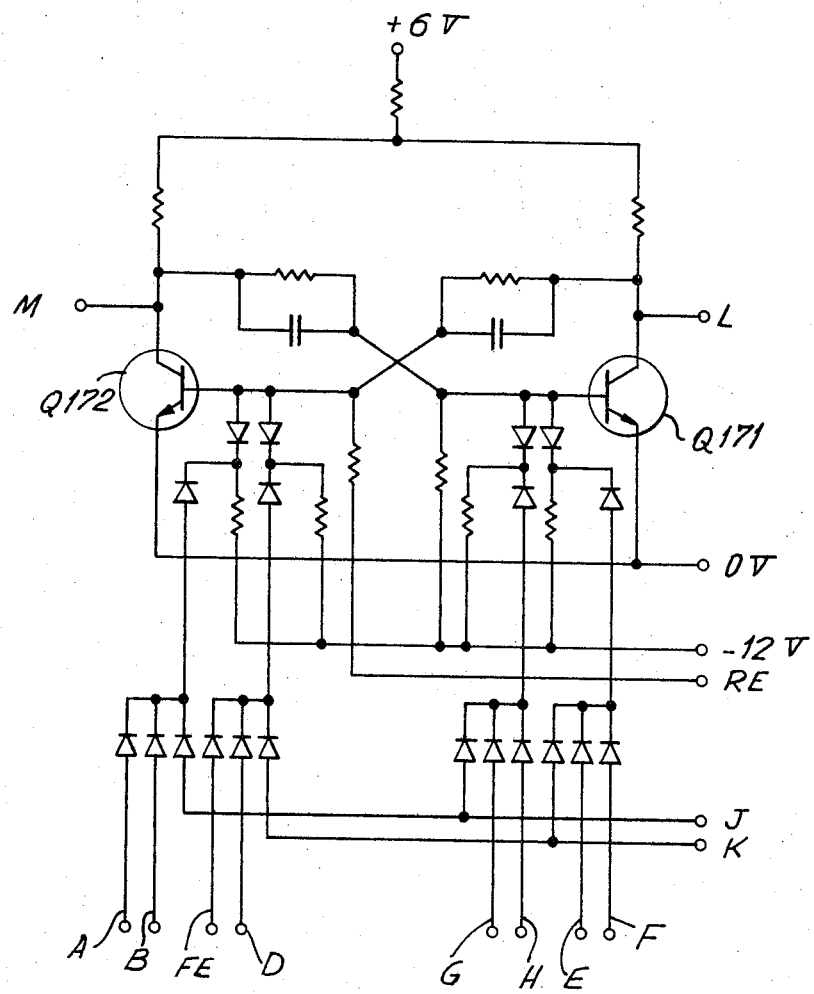
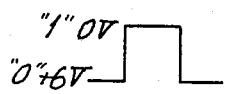

FIG. 20
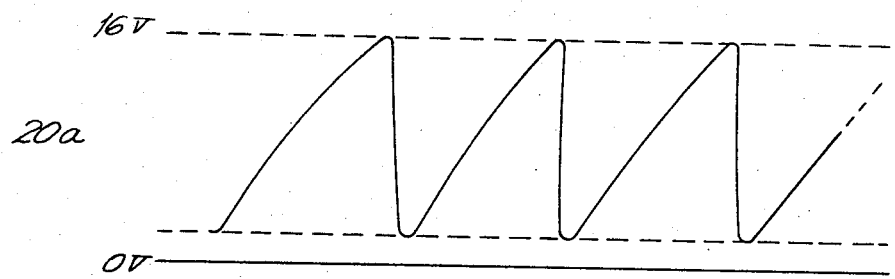
20a
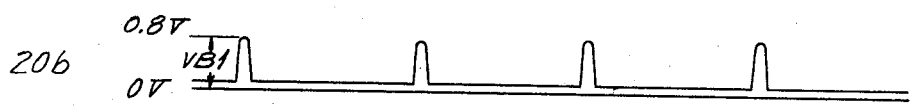
20b
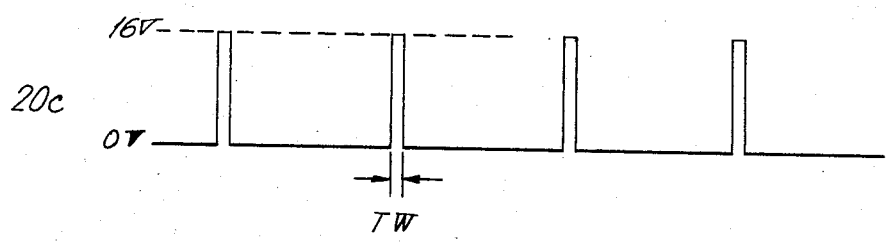
20c

STEP MOTOR ACCELERATION-DECELERATION CONTROL SYSTEM

DESCRIPTION OF THE INVENTION

The present invention relates to a step motor control system. More particularly, the invention relates to a control system for a step motor operating at high speed.

There are various types of step motors. A representative type is a pulse motor. As is well known, a pulse motor is rotated in response to an input pulse train supplied to the motor. The motor rotates by an angle correspondingly proportional to the number of control pulses in the input pulse train. The speed of the pulse motor is therefore proportional to the frequency of the input pulse train. In accordance with this characteristic, pulse motors are utilized for the numerical control of machine tools such as milling machines, engine lathes and drilling machines, or various types of industrial machines such as gas cutters.

In a numerical control system, the control pulse train is provided by a control device comprising an electronic circuit. The control pulse train is supplied to a pulse motor to rotate said pulse motor and thereby vary the position of the table of the machine, the cutter, the writing stylus, the flame or the like operating tool. In order to control the controllable member, such as the table of the machine or the tool of the machine, at a high speed, the pulse motor must rotate correctly or accurately in response to a pulse train of higher frequency. However, the maximum pulse frequency for properly starting a pulse motor at standstill is approximately 2,000 pulses per second. If the frequency of the input pulse train is increased gradually, rather than rapidly, however, a pulse motor may be rotated in response to a pulse train having a frequency of 10 to several thousand pulses per second. On the other hand, even when a supplied pulse train has a frequency in a range in which the pulse motor responds satisfactorily, if the pulse frequency is decreased rapidly, so that the pulse interval is increased rapidly in part of the pulse train, the pulse motor responds erroneously and the proportional relationship between the number of pulses in the pulse train and the angle of rotation of the pulse motor is destroyed. As described, a pulse motor is required, on one hand, to properly respond to a pulse train of high frequency, but, on the other hand, responds erroneously if the frequency of the pulse train changes rapidly.

Another well-known type of step motor controlled by a pulse train is a digital electrohydraulic servomotor. The motor rotates through a specific angle each time a pulse is supplied thereto. The motor comprises an electrohydraulic servo valve, a hydraulic motor, a polyphase detector and a detecting signal selective circuit. The polyphase detector provides polyphase detecting signals of phases shifted from each other by a specific angle in response to the rotation of the hydraulic motor. The detecting signal selective circuit selects a detecting signal successively each time a command or control pulse is supplied. The selected detecting signals are supplied to the electrohydraulic servo valve via an amplifier, and the hydraulic motor is rotated until no detecting signal is selected. Similarly to the aforedescribed pulse motor, the electrohydraulic servomotor cannot respond properly if the control pulse train has a high frequency and responds erroneously if the frequency of the control pulse train varies rapidly.

The principal object of the present invention is to provide a new and improved step motor control system.

An object of the present invention is to provide a step motor control system which overcomes the disadvantages of known types of control systems.

An object of the present invention is to provide a step motor control system for controlling a step motor so that it responds to control pulses and is rotated through a specific angle each time a pulse is supplied thereto even when the control pulse train has a relatively high frequency.

An object of the present invention is to provide a step motor control system which functions with efficiency, effectiveness and reliability and which operates a step motor with efficiency, effectiveness and reliability.

In accordance with the present invention, a step motor control system for controlling a step motor or the like comprises a pulse supply for supplying a train of control pulses to a step motor. A pulse control circuit connected between the pulse supply and the step motor gradually increases the frequency of pulses in the beginning of the pulse train and gradually decreases the frequency of pulses in the end of the pulse train thereby enabling proper starting and stopping of the motor when the motor operates at high speed.

The pulse control circuit comprises a reversible counter having inputs and outputs for storing pulses supplied thereto. An input supplies the train of control pulses to an input of the reversible counter for storage therein. A variable frequency oscillator coupled to an output of the reversible counter provides pulses having a frequency proportional to the content of the reversible counter. An AND gate has an input connected to the output of the reversible counter, an input connected to another output of the reversible counter and an output connected to an output and to an input of the reversible counter. The AND gate transfers pulses provided by the variable frequency oscillator to the output when the content of the reversible counter is not zero and feeds back the transferred pulses to the reversible counter in a manner whereby each fed back pulse is subtracted from the content of the reversible counter.

In order that the present invention may be readily carried into effect, it will now be described with reference to the accompanying drawings, wherein:

FIGS. 9A, 9B, 9C, 9D, 9E and 9F are symbols representing the circuit components utilized in the pulse control circuit of the present invention;

FIG. 10 is a detailed block diagram of the bidirectional embodiment of the pulse control circuit of the present invention;

Figure 8:
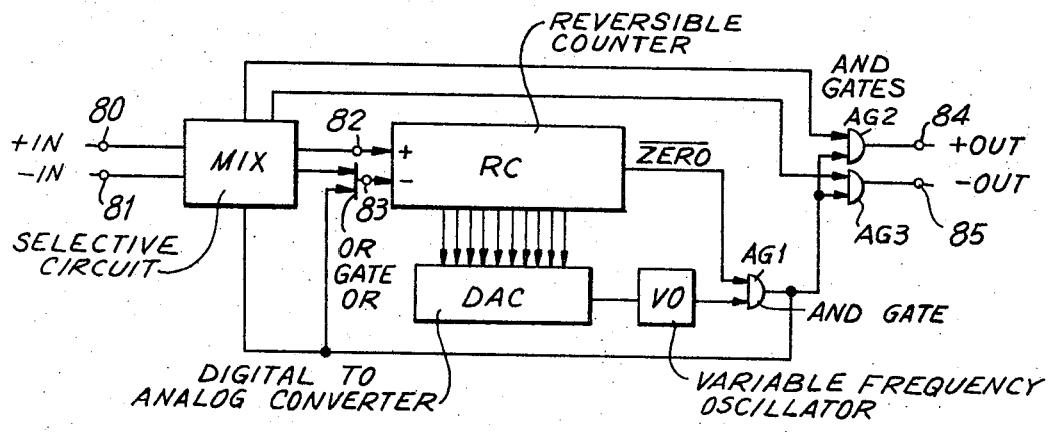
FIG. 8 is a block diagram of the bidirectional embodiment of the pulse control circuit of the present invention.
Figure 13A:
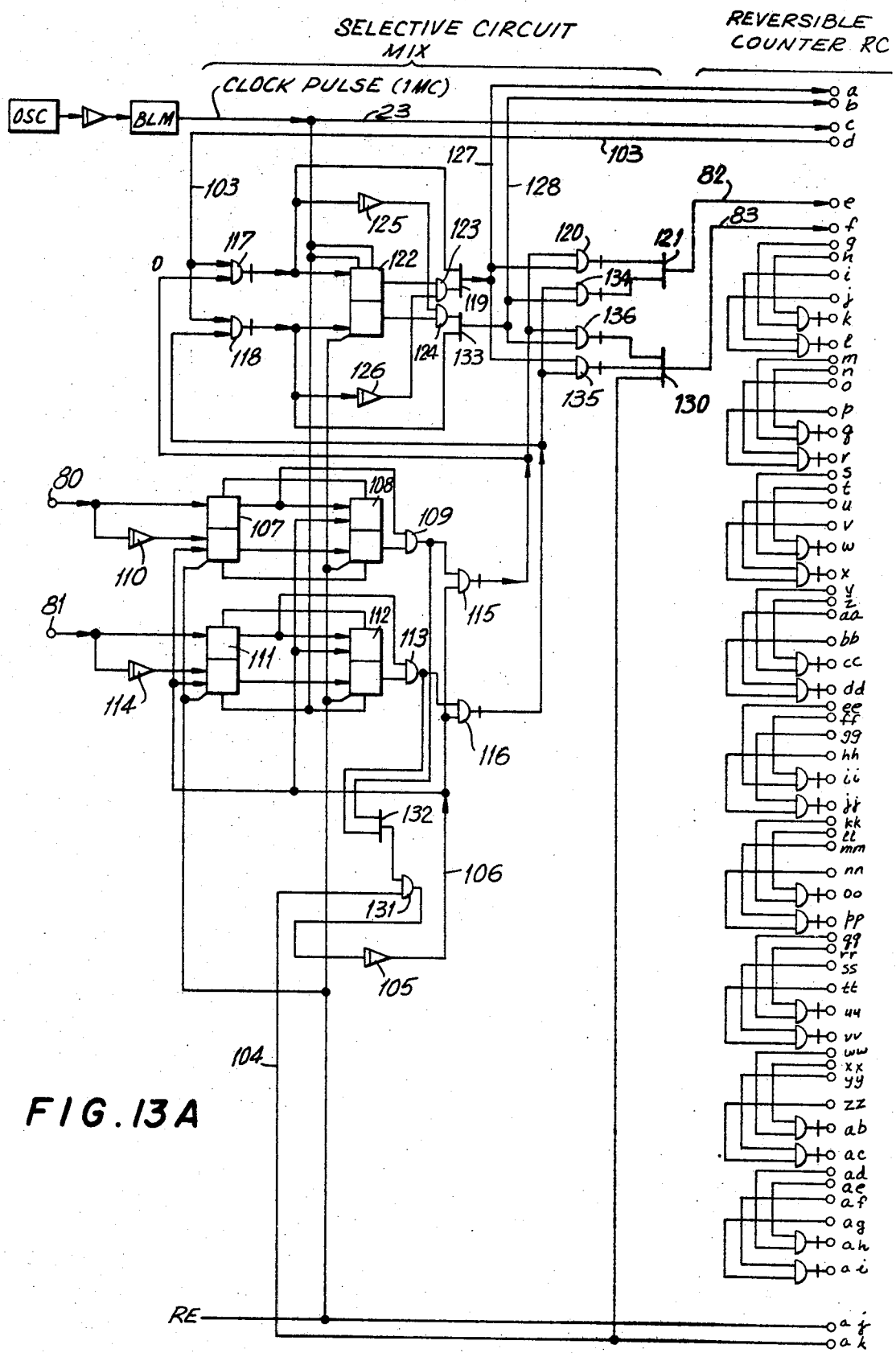
Figure 13B:
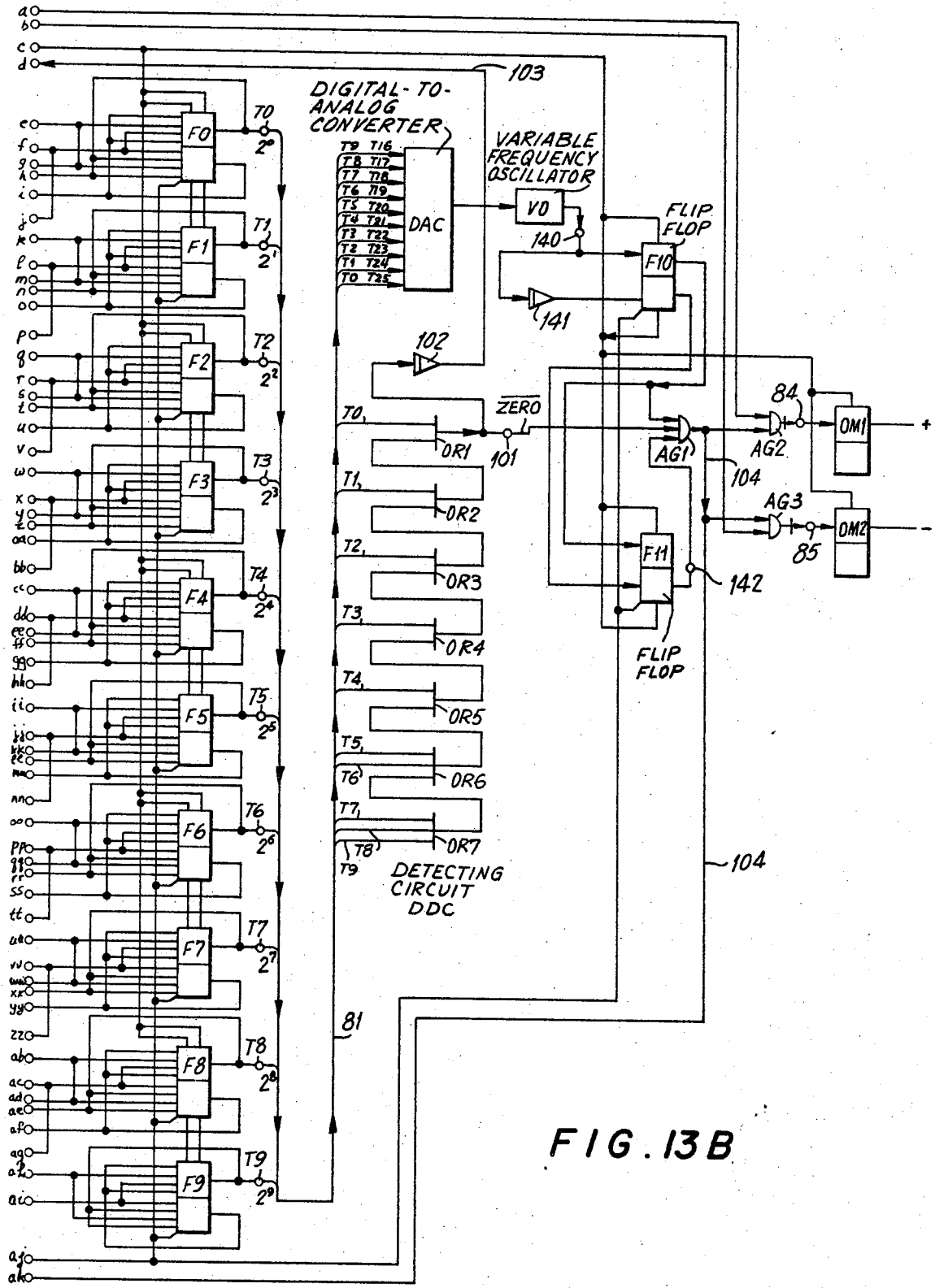
Figure 14:
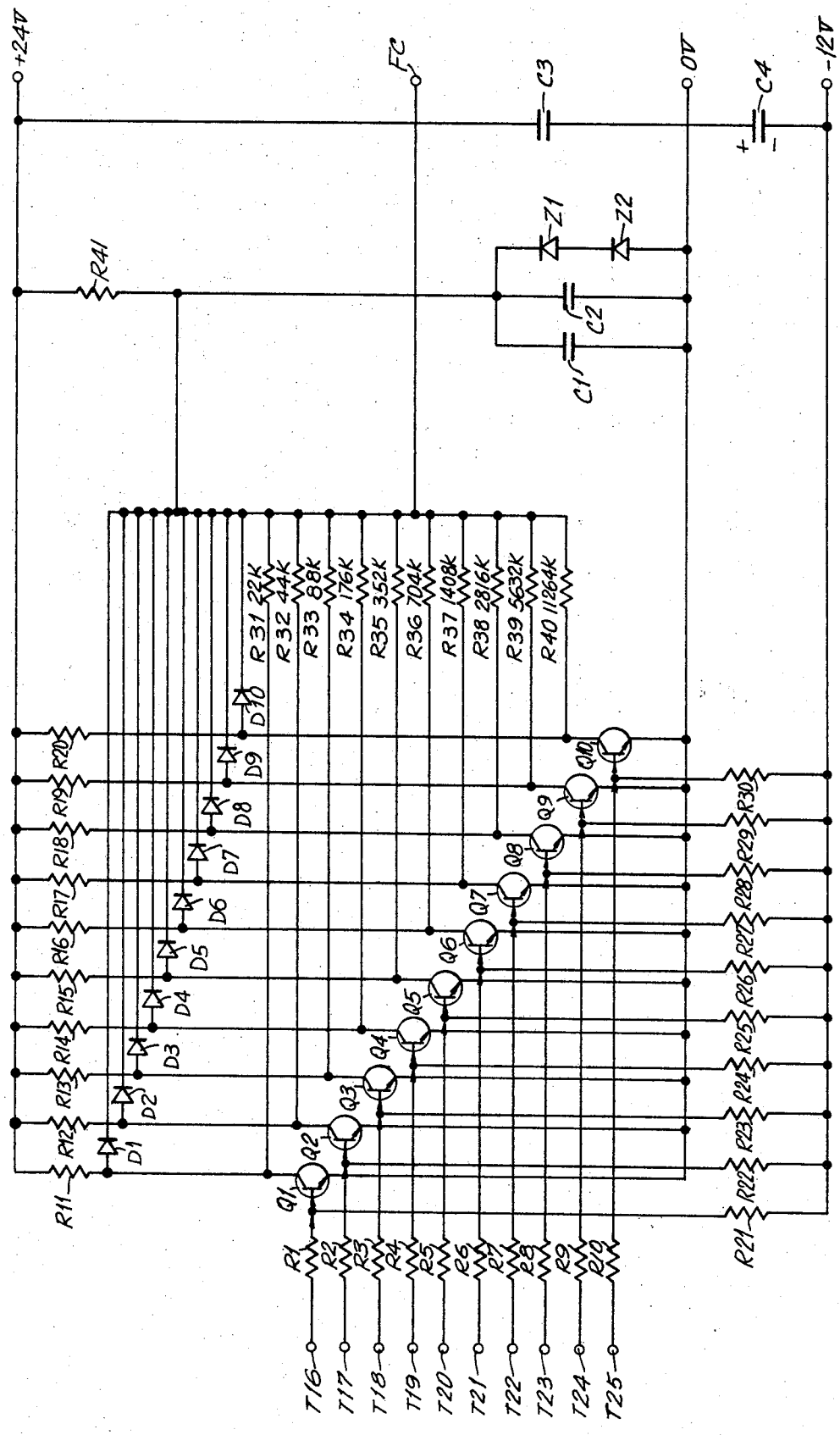
Figure 15:
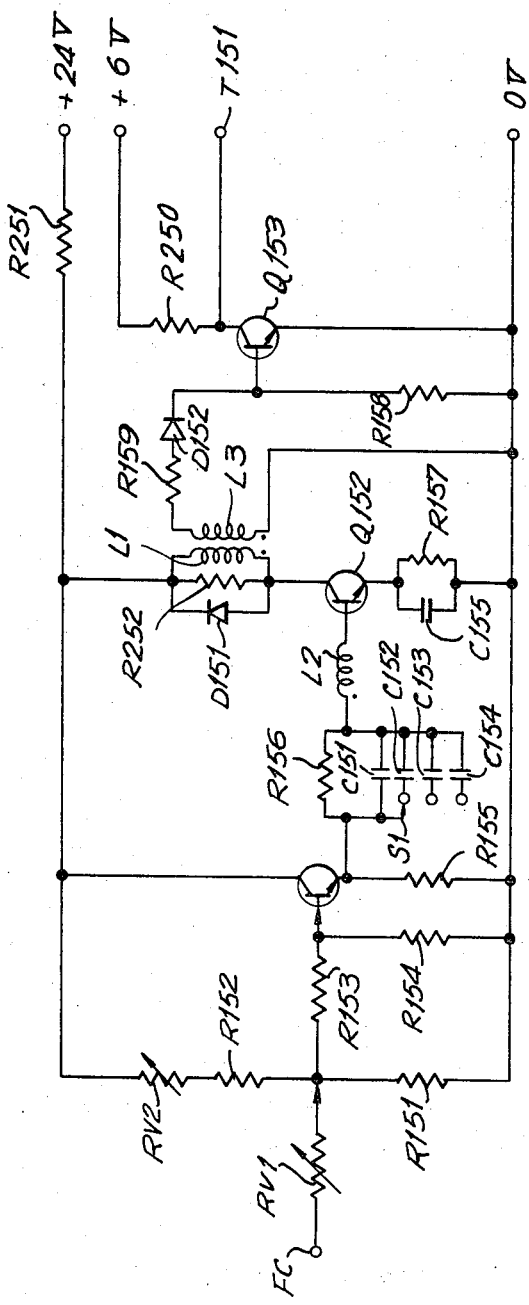
Figure 16:
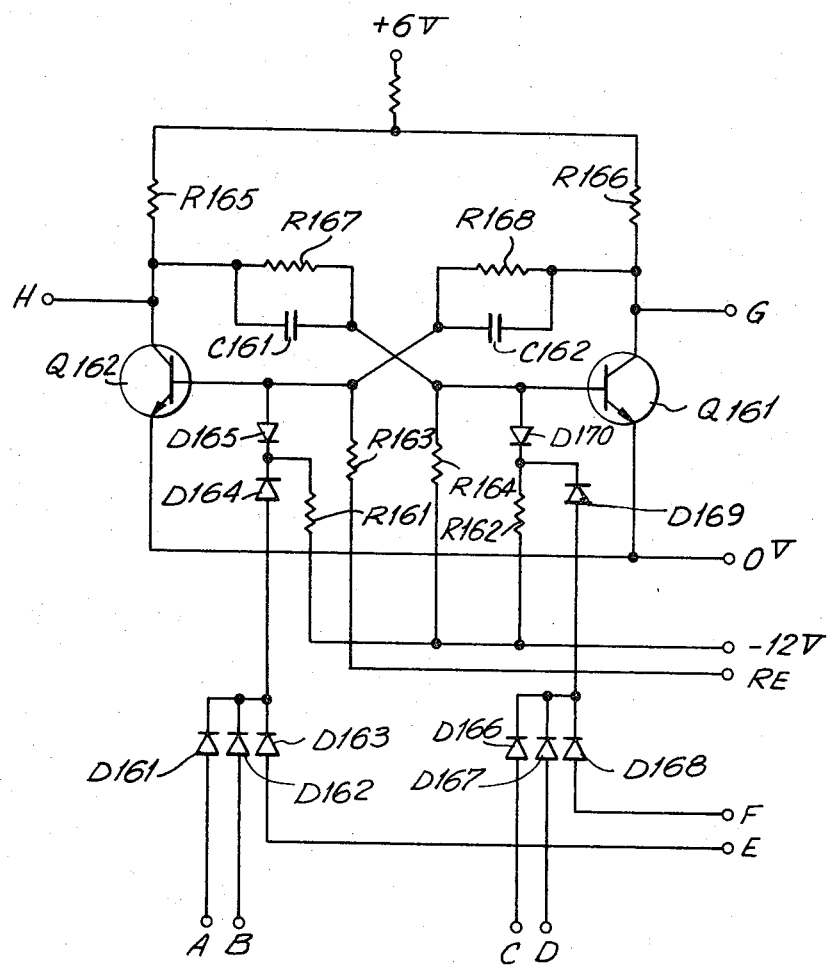
Figure 19:
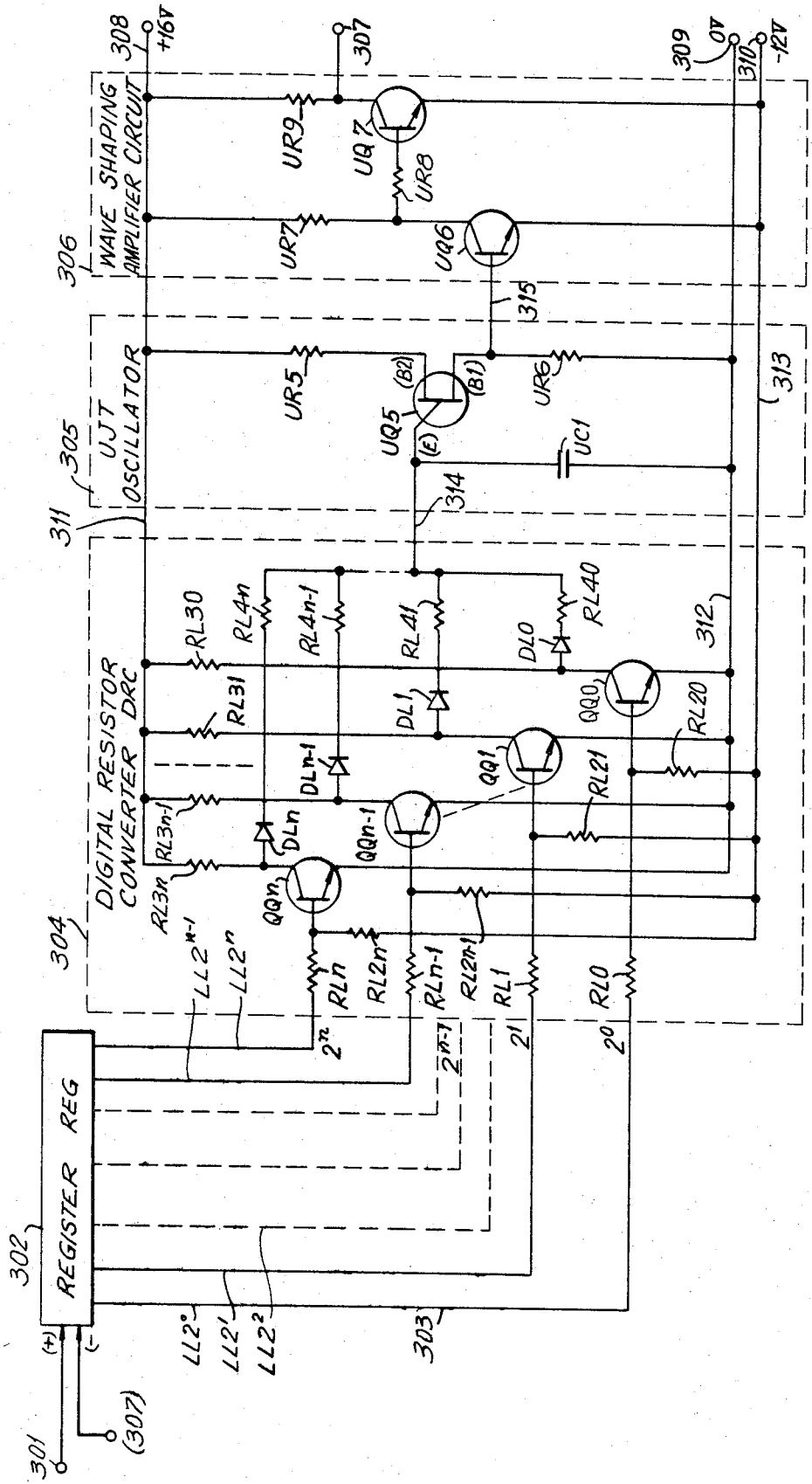
Figure 18:
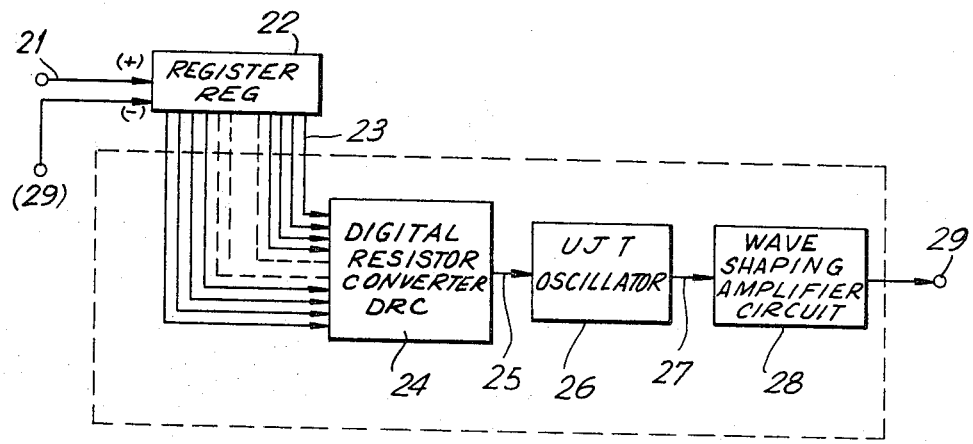
Figure 21:
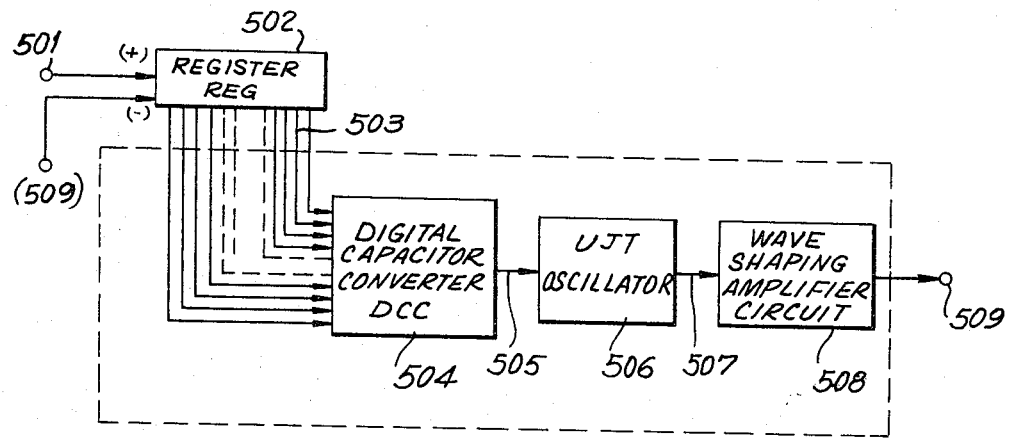
Figure 22:
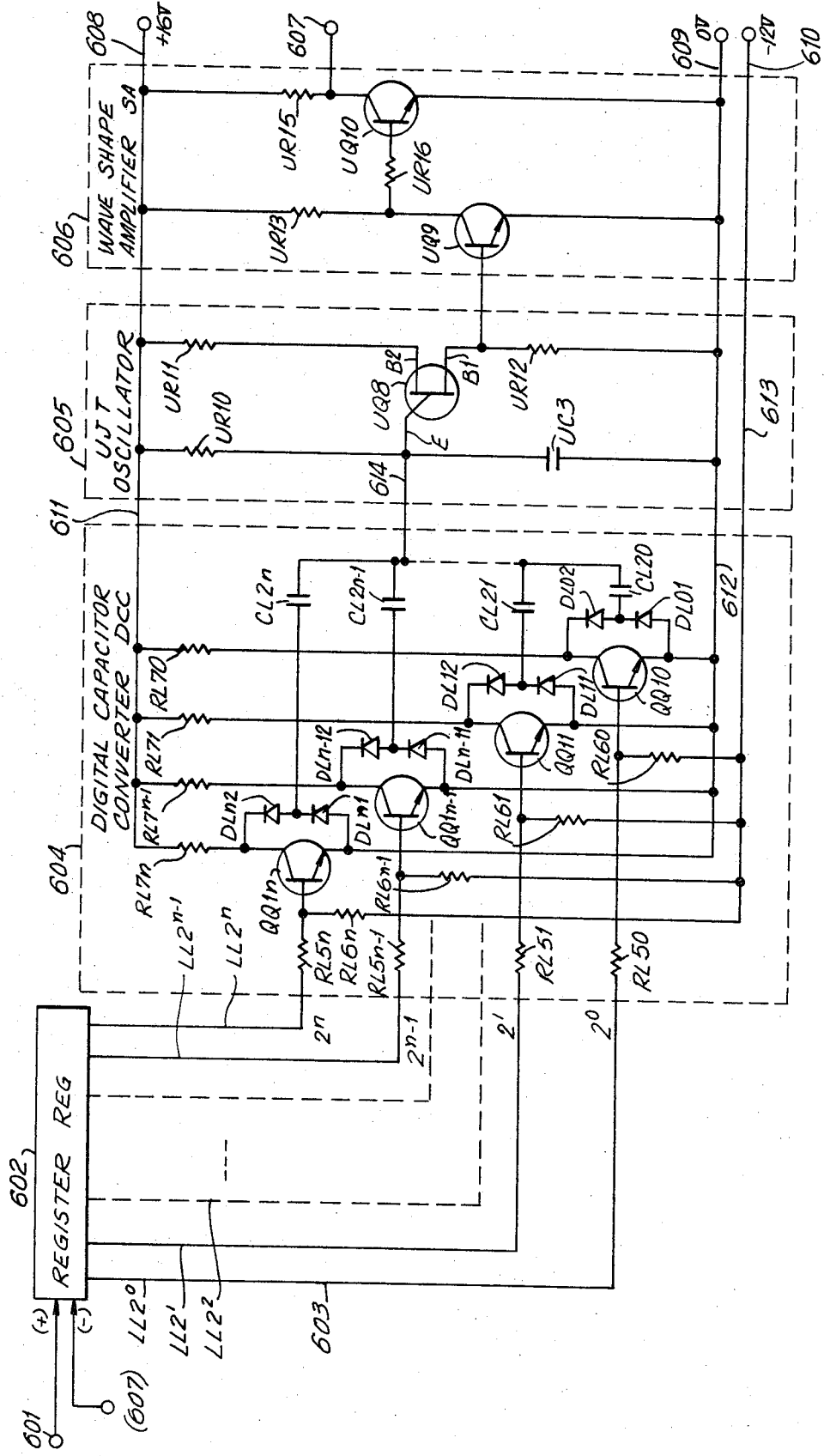

FIGS. 13A and 13B, together constitute a detailed block diagram of the bidirectional embodiment of the pulse control circuit of FIGS. 8 and 10;

FIG. 14 is a circuit diagram of an embodiment of the digital-to-analog converter of the pulse control circuit of the present invention;

FIG. 15 is a circuit diagram of an embodiment of the variable frequency oscillator of the pulse control circuit of the present invention;

FIG. 16 is a circuit diagram of an embodiment of the flip-flop of FIG. 9D;

FIG. 17 is a circuit diagram of an embodiment of the flip-flop of FIG. 9E;

FIG. 18 is a block diagram of another embodiment of the digital-to-analog converter and the variable frequency oscillator of the step motor control system of the present invention;

FIG. 19 is a detailed circuit diagram of the block diagram of FIG. 18;

FIG. 20 is a group of graphical illustrations for explaining the operation of the variable frequency oscillator of FIG. 19;

FIG. 21 is a block diagram of another embodiment of the digital-to-analog converter of the pulse control circuit of the present invention;

FIG. 22 4a detailed circuit diagram of the embodiment of FIG. 21; and

Figure 23:
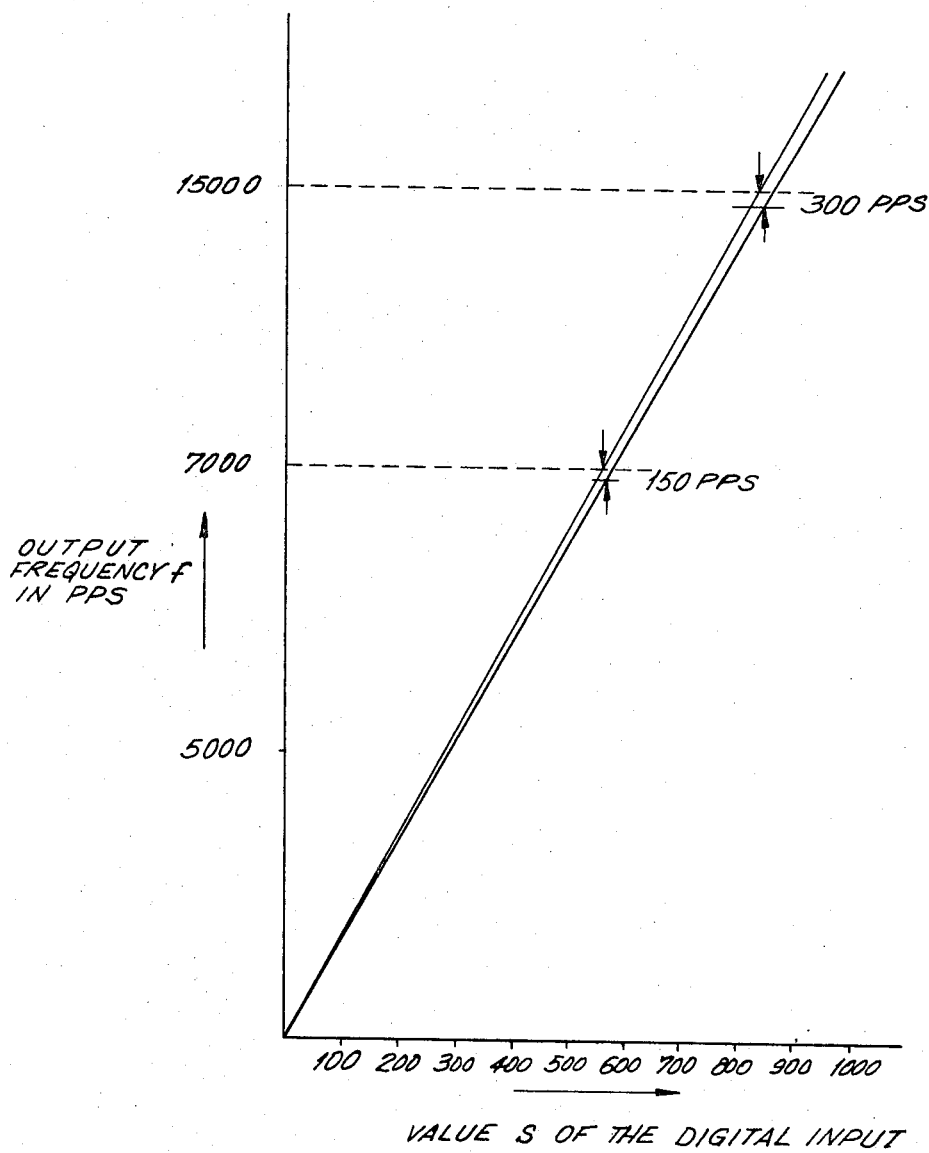

FIG. 23 is a graphical presentation of the frequency characteristic of the digital-to-analog converter of FIG. 21.

In the FIGS., the same components are identified by the same reference numerals.

Figure 1:
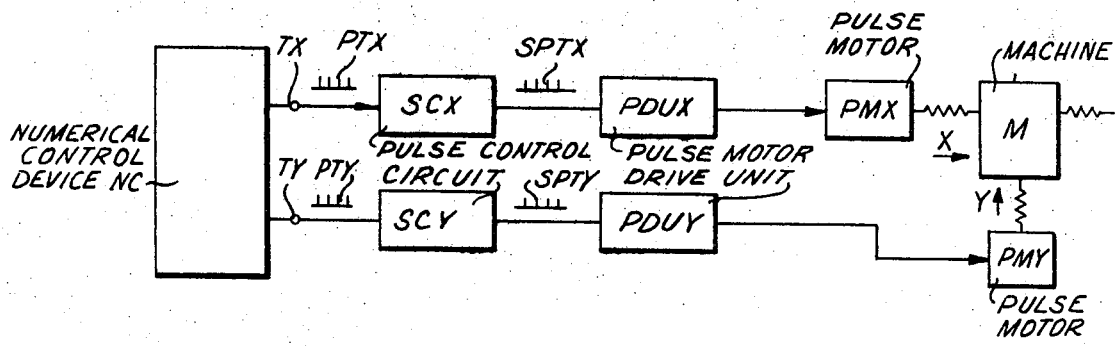
FIG. 1 is a block diagram of a numerical control system utilizing the step motor control system of the present invention.

In FIG. 1, a table of a machine M is movable in directions along the X-axis and in directions along the Y-axis by a pulse motor PMX and a pulse motor PMY. A numerical control device NC provides a pulse train PTX at its output terminal TX and an output pulse train PTY at its output TY. The pulse trains PTX and PTY rotate the pulse motors PMX and PMY, respectively.

In accordance with the present invention, pulse control circuits SCX and SCY are provided for converting the pulse trains PTX and PTY into pulse trains SPTX and SPTY, respectively. The frequencies of the pulse trains SPTX and SPTY do not vary rapidly. That is, the pulse intervals of the pulse trains are varied gradually, and not rapidly. The controlled pulse trains SPTX and SPTY are supplied to the pulse motors PMX and PMY respectively, via pulse motor drive motor drive units PDUX and PDUY, respectively.

The pulse motor PMX is rotated one step each time one pulse is supplied to the drive unit PDUX and the pulse motor PMY is rotated one step each time one pulse is supplied to the drive unit PDUY. The numerical control system of FIG. 1 is different from known numerical control systems due to the utilization of the pulse control circuits SCX and SCY. In FIG. 1, the numerical control system may control two axes. The step motor control system of the present invention, however, is, of course, applicable to numerical control systems which control one, two, three, or more axes.

Figure 2:
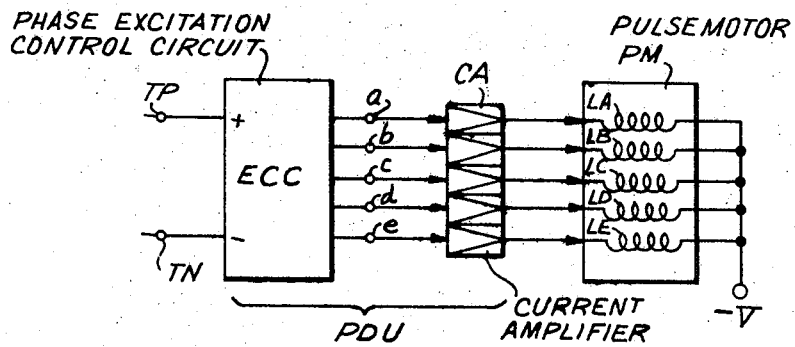
FIG. 2 is a block diagram of a pulse motor and a pulse motor drive unit.
Figure 3:
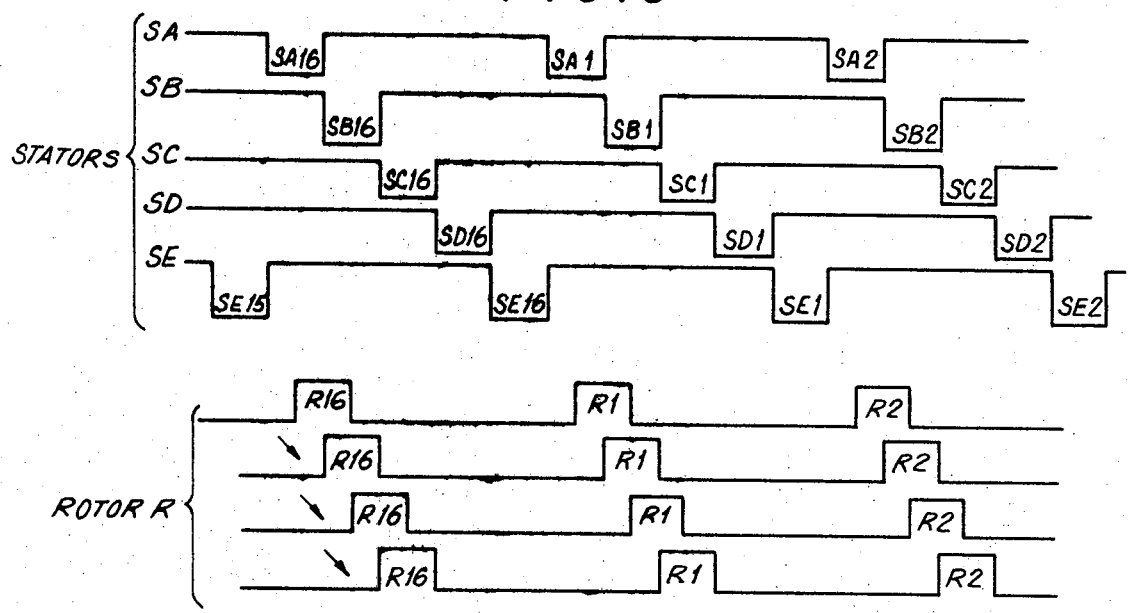
FIG. 3 is a graphical illustration illustrating the operation of a pulse motor.

FIG. 2 illustrates the connection of a pulse motor drive unit with a pulse motor and FIG. 3 illustrates the operation of a five phase pulse motor. In FIG. 2, a pulse motor PM has five stator windings LA, LB, LC, LD and LE. A three to two phase excitation control circuit ECC has a positive input terminal TP, a negative input terminal TN and five output terminals $a$, $b$, $c$, $d$ and $e$. The output terminals $a$ to $e$ of the phase excitation control circuit ECC are coupled to the stator windings LA to LE of the pulse motor PM via a current amplifier CA. The phase excitation control circuit ECC and the current amplifier CA together function as the drive unit PDUX or PDUY.

If it is assumed that output signals are provided in only the output terminals $a$ and $b$ of the excitation control circuit ECC of FIG. 2, excitation current will flow only to the stator windings LA and LB of the pulse motor PM. If a pulse is then supplied to the positive input terminal TP of the excitation control circuit ECC, however, output signals are provided in the output terminals $a$, $b$ and $c$ of said excitation control circuit and excitation current is supplied to the stator windings LA, LB and LC of the pulse motor PM.

If another pulse is then supplied to the positive input terminal, output signals are provided only in the output terminals $b$ and $c$ of the excitation control circuit ECC and excitation current flows only to the stator windings LB and LC of the pulse motor PM. Thus, each time a pulse is supplied to the positive input terminal TP, output signals appear at output terminals of the excitation control circuit in the order $bcd$ $cd$ $cde$ $de$ $dea$ $ea$ $eab$ $ab$.

The pulse motor of FIG. 3 has five stators SA, SB, SC, SD, and SE and one rotor R. The five stators SA to SE are excited by the five stator windings LA to LE of FIG. 2. A stator SA has from each other. The remaining stators SB to SE are identical with the stator SA. The projections of a pair of next-adjacent stators are displaced from each other by one-fifth pitch. The rotor R has 16 rotor projections R1 to R16.

FIGS. 2 and 3 explain the principle of rotation of the rotor of the pulse motor. If it is assumed that in the initial condition, the stator windings LA and LB are excited, the projections R1 to R16 of the rotor R stop between projections of the stators SA and SB. In other words, the projection R1 of the rotor R is at an intermediate position between the stator projections SA1 and SB1, the projection R2 of the rotor is at an intermediate position between the stator projections SA2 and SB2, and the projection R16 of the rotor is at an intermediate position between the stator projections SA16 and SB16. This condition is illustrated in the fourth from the bottom row of FIG. 3.

If, in the condition illustrated in FIG. 3, a pulse is supplied to the positive input terminal TP of the phase excitation control circuit of FIG. 2, excitation current is supplied to the stator windings LA, LB and LC of the pulse motor, as hereinbefore described. Consequently, the rotor R steps to the position illustrated in the third from the bottom row of FIG. 3, wherein the rotor projections R1 to R16 are opposed to the stator projections SB1 to SB16. Thus, each time a pulse is supplied to the positive input terminal TP, the rotor steps one step, thereby occupying each of the positions shown in the next to the bottom row, the bottom row, and so on, of FIG. 3.

Each time a pulse is supplied to the negative input terminal TN of the phase excitation control circuit ECC of FIG. 2, the output condition of said excitation control circuit is varied as $ab$ $eab$ $ea$ $dea$ $de$ $cde$ $cd$ $bcd$ $bc$ $abc$ $ab$. The output condition of the excitation control circuit thus varies completely oppositely when pulses are supplied to the negative input terminal TN as opposed to the positive input terminal TP. Consequently, the rotor R of the pulse motor PM is rotated in the reverse direction when pulses are supplied to the negative input terminal TN.

As indicated by the foregoing, the pulse motor steps in the positive or negative direction each time a pulse is supplied to the positive or negative input terminal of the excitation control circuit ECC of FIG. 2. If the frequency of pulses supplied to the excitation control circuit ECC is high, the excitation of the stator is switched before the rotor reaches the normal position. Consequently, the rotor responds erroneously. If the frequency of the pulses supplied to the excitation control circuit varies rapidly so that the pulse interval is rapidly increased, for example, when a pulse train having a high frequency is supplied to said excitation control circuit and the pulse motor is rotated at high speed, the rotor attempts to maintain the rotary speed by the inertia of the load. The relation between the excitation condition and the position of the rotor is consequently disrupted and the pulse motor responds erroneously.

Figure 4:
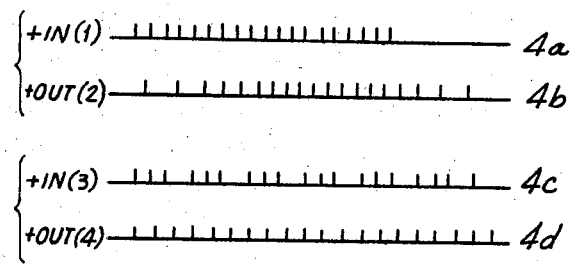
FIG. 4 is a series of graphical illustrations of control pulses illustrating the principle of the present invention.

In FIG. 4, the curves 4a and 4c illustrate examples of control or command pulse trains PTX or PTY provided by the numerical control device NC of FIG. 1. The pulse train 4a has a very high constant frequency, so that the intervals between next-adjacent pulses are equal. The pulse train 4a reaches its high frequency rapidly, continues at it high frequency for a determined period of time, and then decreases to zero abruptly. It may be said that, in a wide sense, this is also an example of a pulse train having a frequency which is changed rapidly. A pulse motor cannot be driven when the pulse train 4a is supplied thereto and if the pulse motor is rotating, it cannot stop at the proper position immediately after the last pulse in the pulse train is supplied.

The curve 4c of FIG. illustrates a pulse train having a high, and almost constant, frequency, from which several pulses are missing, so that there are exceptionally long intervals between some pairs of next-adjacent pulses. In the pulse train 4c, the pulse intervals are thus rapidly elongated in some places, so that the pulse motor responds erroneously. In the step motor (FIG. 4) provided by the numerical control device NC (FIG. 1) is supplied to the pulse motor drive unit via the pulse control circuit of the present invention.

Due to the operation of the pulse control circuit of the present invention, the pulse train 4a of FIG. 4 is converted to the pulse train 4b of FIG. 4. In the pulse train 4b, the frequency of the pulses is increased gradually in the beginning of the pulse train and is decreased gradually in the end of the pulse train. Since the pulse train 4b is supplied to the pulse motor drive unit, the pulse motor is properly started and properly stopped, although it is rotating at high speed.

The pulse control circuit of the present invention converts the pulse train 4c to the pulse train 4d (FIG. 4). The pulse interval of the pulse train 4d is almost constant. When the pulse train 4d is supplied to the pulse motor drive unit, the pulse motor may rotate at high speed without error.

Figure 5:
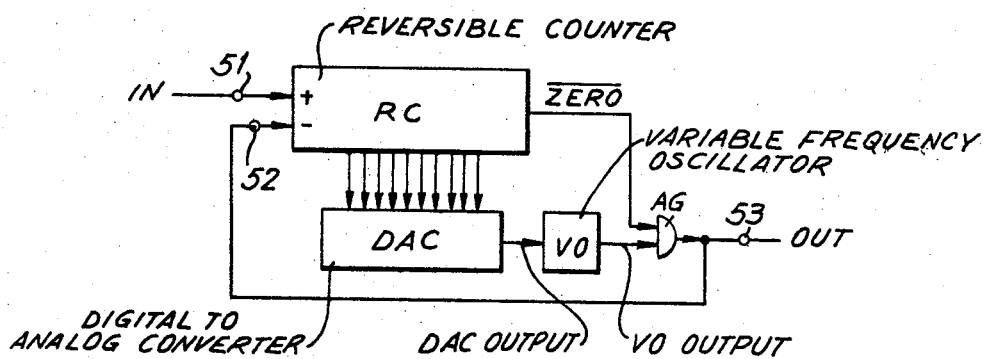
FIG. 5 is a block diagram of a single phase embodiment of the pulse control circuit of the present invention.

FIG. 5 is a block diagram of an embodiment of the pulse control circuit of the present invention. The pulse control circuit of FIG. 5 comprises a reversible counter RC having an input terminal 51 and an input terminal 52. An output of the reversible counter RC is connected to an input of an AND gate AG. A plurality of outputs of the reversible counter RC are connected to inputs of a digital-to-analog converter DAC. The output of the digital-to-analog converter is connected to the input of a variable frequency oscillator VO. The output of the variable frequency oscillator VO is connected to the other input of the AND gate AG. The output of the AND gate AG is connected to an output terminal 53 and, via a feedback path, to the input 52 of the reversible counter RC.

A pulse train from the numerical control device NC (FIG. 1) is supplied to the counting input terminal 51 of the reversible counter RC and the pulses thereof are stored or counted in said counter. The content of the reversible counter RC is converted into voltage signals proportional thereto by the digital-to-analog converter DAC. The variable frequency oscillator VO is controlled by the output voltage of the digital-to-analog converter DAC and provides a pulse train having a frequency proportional to such voltage. If the content of the reversible counter RC is not zero, pulses from the variable frequency oscillator VO are derived from the output terminal 53 via the AND gate AG.

The output pulses derived from the output terminal 53 of FIG. 5 are supplied to the pulse motor drive unit (FIG. 1). The output pulses at the output terminal 53 are also supplied to the subtracting input terminal 52 of the reversible counter RC via the feedback path. Thus, each time a pulse is supplied to the input terminal 52, a 1 is subtracted from the content of said reversible counter. Thus, when the same number of pulses as those supplied to the input terminal 51 have been derived from the output terminal 53, the content of the reversible counter RC becomes zero. The AND gate AG is therefore switched to its nonconductive condition and there is no pulse provided at the output terminal 53 thereafter.

Figure 6:
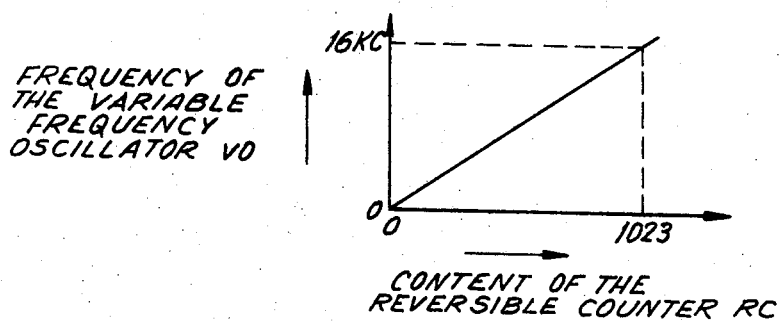
FIG. 6 is a graphical illustration of the content of the reversible counter versus the output pulse train frequency of the variable frequency oscillator of the embodiment of FIG. 5.

FIG. 6 illustrates the relation between the content of the reversible counter RC and the frequency of the output pulses provided by the variable frequency oscillator VO. The number of digits of the reversible counter RC may be approximately 10 and said counter may count from zero to 1,023. The frequency of the variable frequency oscillator VO is varied in proportion to the content of the counter RC within a range of 0 to 16 kilocycles per second. In FIG. 6, the abscissa represents the content of the reversible counter RC and the ordinate represents the frequency of the variable frequency oscillator VO.

When a pulse train, as shown in the curves 4a and 4c of FIG. 4, is supplied to the pulse control circuit of FIG. 5, a pulse train having an averaged frequency is provided at the output terminal 53 of said pulse control circuit, due to the delay in response of the digital-to-analog converter and the variable frequency oscillator. A pulse train of the type of curves 4b or 4d of FIG. 4 is thus provided at the output terminal 53 and has a frequency which is not varied rapidly.

The pulse control circuit of FIG. 5 is of unidirectional type. A bidirectional pulse control circuit may be readily provided by adding circuit components to the circuit of FIG. 5. The bidirectional pulse control circuit is utilized when a pulse train of positive pulses is provided in one axis and a pulse train of negative pulses is provided in the other axis from the numerical control device NC, as shown in FIG. 7.

Figure 7:
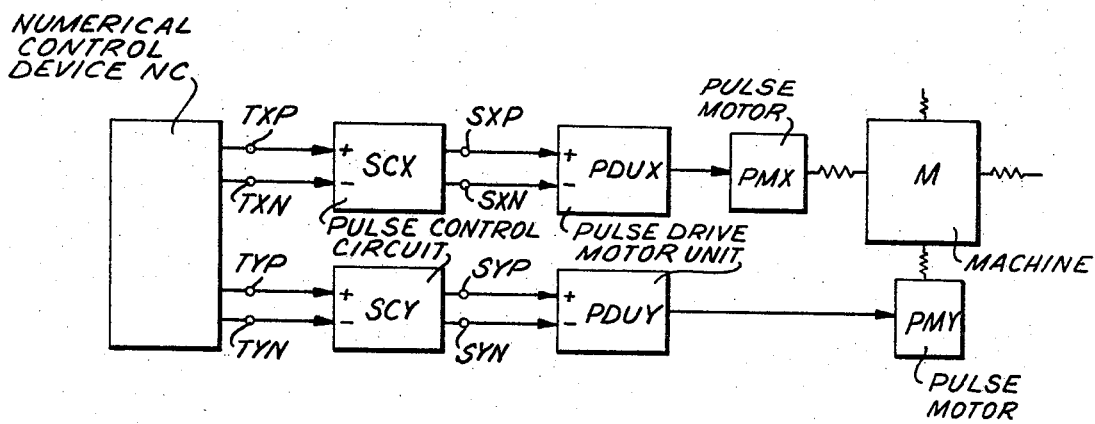
FIG. 7 is a block diagram of a numerical control system utilizing another embodiment, which is a bidirectional modification, of the step motor control system of the present invention in which positive and negative pulses are supplied in each of two axes.

The numerical control device NC of the numerical control system of FIG. 7 has output terminals TXP and TXN for the positive and negative pulses in X-axial directions and output terminals TYP and TYN for the positive and negative pulses in Y-axial directions. The positive X-axial pulses are supplied from the output terminal TXP to the rotary pulse motor PMX to rotate said motor in a positive direction and the negative X-axis pulses are supplied to said motor to rotate said motor in a negative direction. The pulse control circuit SCX has a positive X-axis output terminal SXP and a negative X-axis output terminal SXN. The pulse control circuit SCY has a positive Y-axis output terminal SYP and a negative Y-axis output terminal SYN.

When a pulse is provided at the output terminal SXP of the pulse control circuit SCX, the pulse motor PMX is rotated in a positive direction. When a pulse is provided at the output terminal SXN of the pulse control circuit SCX, the pulse motor PMX is rotated in a negative direction. The pulse motor PMY is operated in a manner similar to the pulse motor PMX by the output signals at the output terminals SYP and SYN of the pulse control circuit SCY.

FIG. 8 illustrates a bidirectional pulse control circuit of the present invention, as utilized in the numerical control system of FIG. 7. The bidirectional pulse control circuit of FIG. 8 comprises a selective circuit MIX, the reversible counter RC, the digital-to-analog converter DAC, the variable frequency oscillator VO, the AND gate AG1, an OR gate OR and AND gates AG2 and AG3. Input terminals 80 and 81 are connected to output terminals TXP and TXN of FIG. 7.

The selective circuit MIX determines whether a pulse supplied to the input terminal 80 for rotating the pulse motor in a positive direction is supplied to the adding input terminal 82 of the reversible counter RC, or to the subtracting input terminal 83 of said reversible counter. The selective circuit MIX then determines whether a pulse supplied to the input terminal 81 for rotating the pulse motor in a negative direction is supplied to the adding input terminal 82 or to the subtracting input terminal 83 of the reversible counter RC. The selective circuit MIX also determines whether an output pulse provided at the output of the AND gate AG1 is supplied to the output terminal 84 or the output terminal 85 and also prevents input pulses supplied from the input terminal 80 or 81 to the subtracting input terminal 83 of the reversible counter RC from overlapping with pulses supplied via the feedback path from the output of the AND gate AG1 to said subtracting input terminal. The remaining components of FIG. 8 are identical with those of FIG. 5 and function in a similar manner. The output terminals 84 and 85 of FIG. 8 correspond to the output terminals SXP and SXN of FIG. 7, for example.

Figure 9C:
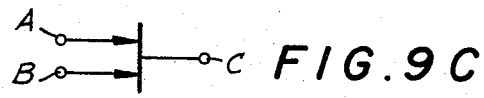

Symbols of the various circuit components shown in the FIGS. are shown in FIGS. 9A to 9F. In the present disclosure, ±6 volts corresponds to the logical value 0 and 0 volts corresponds to the logical value 1. FIG. 9A shows an inverter. An output is provided at the output terminal B when the input at the input terminal A is 0 and no input is provided at said output terminal when said input is 1.

FIG. 9B is an AND gate. When the inputs to both input terminals A and B are 1, the output at the output terminal C is 1. Otherwise, there is no output at the output terminals C. FIG. 9C is an OR gate. When the input signal at one of the input terminals A and B is 1, there is an output signal 1 provided at the output terminal C.

FIG. 9D is a flip-flop having set inputs A and B, reset inputs C and D, a set output G, clock inputs E and F and a reset output H. The flip-flop of FIG. 9D has a reset terminal RE. When a signal 1 is supplied to each of the inputs A, B and E, the flip-flop is set and a signal 1 is provided at the set output G. When a signal 1 is supplied to each of the inputs C, D and F, the flip-flop is reset and a signal 1 is provided at the output terminal H.

FIG. 9E is another type of flip-flop The flip-flop of FIG. 9E has set input terminals A, B, C and D, reset input terminals E, F, G and H, a set output L, a reset output M, a reset terminal RE and clock inputs J and K. When a signal 1 is supplied to each of the input terminals A, B and J, or when a signal 1 is supplied to each of the input terminals C, D and K, the flip-flop is set and a signal 1 is provided at the output terminal L. When a signal 1 is supplied to each of the input terminals E, F and K, or when a signal 1 is supplied to each of the input terminals G, H and J, the flip-flop is reset and a signal 1 is provided at the output terminal M.

FIG. 9F is a monostable or one-shot multivibrator. The multivibrator of FIG. 9F has a set input terminal A, a clock input terminal B and a set output terminal C. When a signal 1 is supplied to both input terminals A and B, a signal 1 is provided at the output terminal C.

FIG. 10 is an embodiment of the selective circuit MIX of the pulse control circuit of FIG. 8. Clock pulse input terminals of the flip-flops of FIG. 10 are omitted in order to maintain the clarity of illustration. In this embodiment of the present invention, the frequency of the clock pulses is 1 megacycle per second and is very high relative to the frequency of the pulses of the pulse trains supplied to the input terminals 80 and 81 and of the pulses of the pulse train provided by the variable frequency oscillator VO. In FIG. 10, in the initial condition, the content of the reversible counter RC is zero and 0 is provided in a lead 101, so that the output of the AND gate AG1 is 0. The inverter 102 converts the 0 signal to a signal 1 and a 0 in a lead 104 is converted to a signal 1 by an inverter 105, so that a 1 appears in a lead 106. All the flip-flops are then in reset condition.

If a pulse is supplied to the input terminal 80, a flip-flop 107 is set simultaneously with the supply of a clock pulse thereto. A flip-flop 108 is also set as soon as the next clock pulse is supplied thereto. A signal 1 is provided at the output of an AND gate 109 during the interval between the setting of the flip-flop 107 and the setting of the flip-flop 108. The interval is a period of 1 microsecond of clock pulses. When there is no longer a signal 1 at the input terminal 80, an inverter 110 resets the flip-flop 107 by providing an output signal 1 and then resets the flip-flop 108. In other words, if an input pulse is supplied to the input terminal 80, a pulse is provided as the output signal of the AND gate 109 at the leading edge of said input pulse.

As hereinbefore described, a signal 1 is provided in the leads 103 and 106, so that when a pulse is provided at the output of the AND gate 109, a signal 1 is provided at the outputs of AND gates 115 and 116. Consequently, a pulse is supplied to the adding input terminal 82 of the reversible counter RC via an OR gate 119, an AND gate 120 and another OR gate 121. In the foregoing process, a flip-flop 122 is set when a signal 1 is provided at the output of the AND gate 117. Since the flip-flop 122 is set and the output of an inverter 126 is 1, the output of an AND gate 123 is 1, so that a signal 1 is provided in the lead 127 at the output of the OR gate 119. The pulse provided at the output of the AND gate 109 each time a pulse is supplied to the input terminal 80 is supplied to the input terminal 82 of the reversible counter RC via the AND gates 115 and 120 and the OR gate 121.

Thus, when the content of the reversible counter RC is not zero, a signal 1 is provided in the lead 101 and the pulse from the variable frequency oscillator VO is supplied to the output terminal 84 via the AND gate AG2. Pulses provided at the output terminal of the AND gate AG1 are supplied to the subtracting input terminal 83 of the reversible counter RC via a lead 129 and an OR gate 130. Each time a pulse is supplied to the input terminal 83, a 1 is subtracted from the reversible counter.

In order to prevent coincidence of the feedback pulses supplied to the counter RC via the lead 129 and the OR gate 130 with the pulses supplied to said counter via the OR gate 121, said feedback pulses are supplied to the AND gate 131 via the lead 104.

When a signal 1 is provided at the output of the AND gate 109, a 1 is provided at the output of the OR gate 132 and the AND gate 131 and a 0 is provided in the lead 106 by the operation of the inverter 105. Consequently, the AND gates 115 and 116 are switched to their nonconductive condition and the flip-flop 108 is prevented from being set until feedback pulses in the lead 104 disappear. When the feedback pulses in the lead 104 disappear, the AND gate 115 is switched to its conductive condition, and pulses are supplied to the input terminal 82 of the reversible counter RC via the aforedescribed circuit. When the same number of pulses as those supplied to the input terminal 80 have been provided at the output terminal 84 via the AND gates AG1 and AG2, the content of the reversible counter RC becomes zero. At such instant, 0 is provided in the lead 101 and the gate AG1 is switched to its nonconductive condition. Thereafter, no pulse is supplied to the output terminal 84 or to the lead 129.

If a pulse is then supplied to the input terminal 81, a 1 is provided at the output of the AND gate 113 at the leading edge of said pulse in the aforedescribed manner. Consequently, a 1 is provided at the outputs of the AND gates 116 and 118 and a 1 is provided in the lead 128 via the OR gate 133. The pulse at the output terminal of the AND gate 116 is therefore supplied to the adding input terminal 82 of the reversible counter RC via the AND gate 134 and the OR gate 121. In the foregoing process, when a signal 1 is provided at the output of the AND gate 118, the flip-flop 122 is reset and a signal 1 is provided at the output of the AND gate 124. A signal 1 is therefore provided in the lead 128 via the OR gate 133 until the flip-flop 122 is set. In succession, the pulse provided at the output of the AND gate 113 each time a pulse is supplied to the input terminal 81 is supplied to the input terminal 82 of the reversible counter RC via the AND gates 116 and 134 and the OR gate 121 and is stored or counted in said counter.

When the content of the reversible counter RC is not zero, a signal 1 is provided in the lead 101 and the output pulse of the variable frequency oscillator VO is supplied to the output terminal 85 via the AND gates AG1 and AG3. Pulses transferred via the AND gate AG1 are supplied to the subtracting input terminal 83 of the counter RC via the lead 129 and the OR gate 130 as feedback pulses. Each time a pulse is supplied to the input terminal 83, a 1 is subtracted from the content of the reversible counter. Even if a 1 is provided at the output of the AND gate 113 when a feedback pulse is provided in the lead 129, a 0 is provided in the lead 106. The AND gates 115 and 116 are thus switched to their nonconductive condition and the flip-flop 112 is prevented from being set. For this reason, there is no pulse supplied to the input terminal 82 of the reversible counter RC via the AND gate 116 while feedback pulses are supplied to the input terminal 83 of said counter. When the same number of pulses as those supplied to the input terminal 81 have been provided at the output terminal 85 via the AND gate AG3, the content of the counter RC reaches zero and the AND gate AG1 is switched to its nonconductive condition.

Pulses are not supplied to the input terminals 80 and 81 simultaneously. When a pulse train is supplied to the input terminal 80, however, and then pulses are supplied to the input terminal 81, before the content of the reversible counter RC becomes zero or vice versa, the operation is as hereinafter described. When a pulse train is supplied to the input terminal 80, as hereinbefore described, the flip-flop 122 is set and a signal 1 is supplied to the AND gate 123. Pulses which have been transferred by the AND gate 115 are supplied to the adding input terminal 82 of the counter RC via the AND gate 120 and the OR gate 121. At such time, the count of the reversible counter RC has a value and pulses are provided at the output terminal 84 via the AND gate AG2.

If pulses are supplied to the input terminal 81 before the content of the counter RC becomes zero, pulses transferred through the AND gate 116 are supplied to the subtracting input terminal 83 of said counter via the AND gate 135 and the OR gate 130. Thus, each time a pulse transferred via the AND gate 116 or a feedback pulse is supplied, 1 is subtracted from the content RC. When the content of the reversible counter RC becomes zero, the AND gate AG1 is switched to its nonconductive condition and no pulses are provided at the output terminal 84. The selective circuit is then returned to its initial condition.

On the other hand, if a pulse train is supplied to the input terminal 81 and pulses are then supplied to the input terminal 80, before the content of the reversible counter RC becomes zero, pulses transferred by the AND gate 115 are supplied to the subtracting input terminal 83 of said counter via the AND gate 136 and the OR gate 130. Thus, each time a pulse which has been transmitted through the AND gate 115 or a feedback pulse in the lead 129 is provided, a 1 is subtracted from the content of the reversible counter RC. When the content of the counter RC becomes zero, a signal 1 is provided in the lead 103 and the selective circuit of FIG. 10 is returned to its initial condition.

Figure 11:
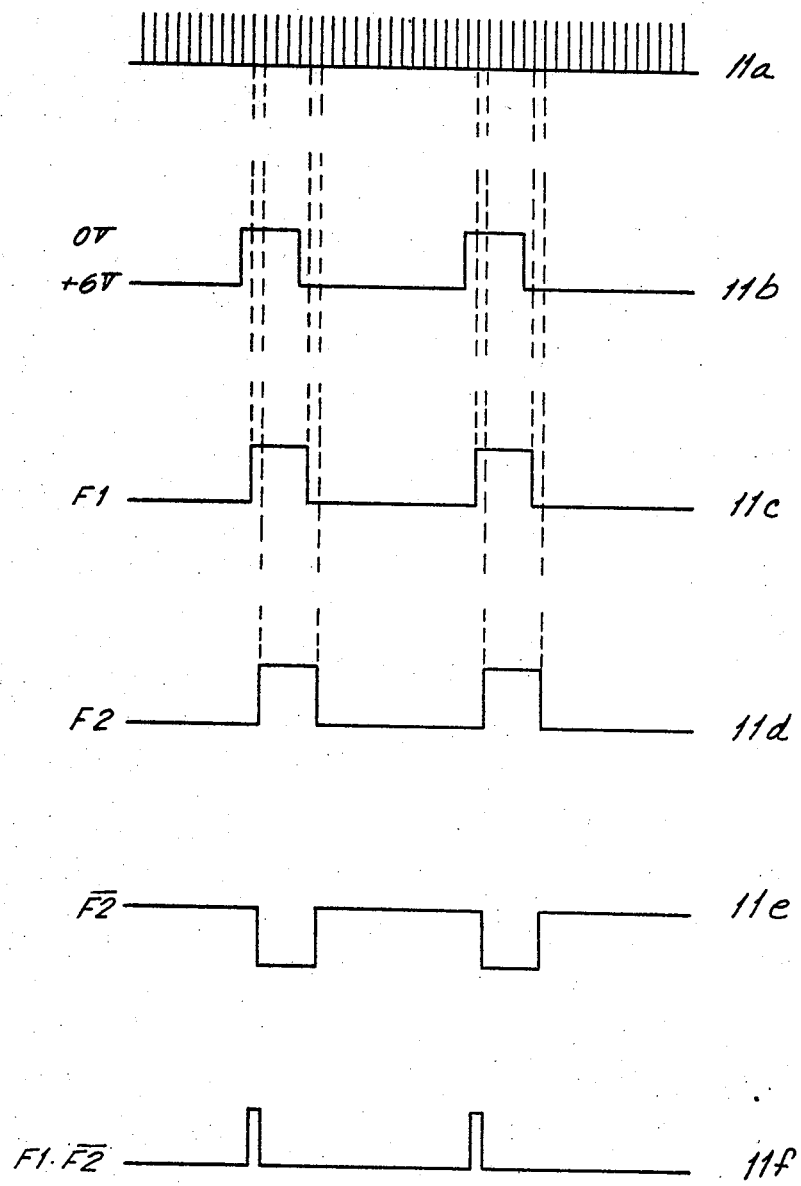
FIG. 11 is a graphical presentation illustrating the operation of the bidirectional pulse control circuit of FIG. 10.

FIG. 11 illustrates the waveforms of the output signals provided by the flip-flops 107 and 108 and the AND gate 109 of FIG. 10. The curve 11a of FIG. 11 illustrates the clock pulses. The curve 11b shows a pulse train supplied to the input terminal 80 of FIG. 10. The curve 11c shows the set output of the flip-flop 107. The curve 11d illustrates the set output of the flip-flop 108. The curve 11e shows the reset output of the flip-flop 108. The curve 11f shows the output signal transferred by the AND gate 109.

Figure 12:
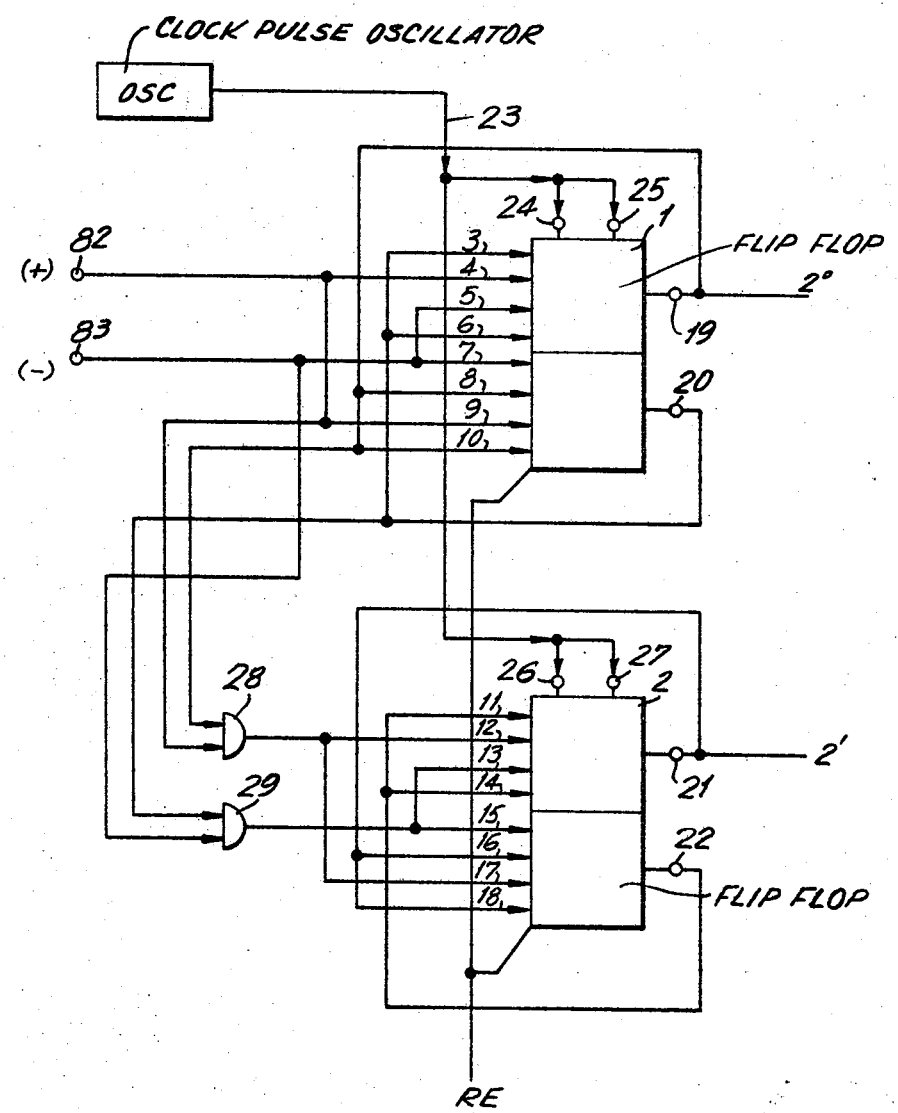
FIG. 12 is a block diagram of an embodiment of the reversible counter of the pulse control circuit of the present invention.

FIG. 12 shows an embodiment of a reversible counter RC. In FIG. 12, in order to facilitate understanding, a binary counter of two digits is illustrated. The binary counter comprises two flip-flops 1 and 2. The flip-flop 1 has four set input terminals 3, 4, 5 and 6, four reset input terminals 7, 8, 9 and 10, a set output terminal 19, a reset output terminal 20 and two clock pulse input terminals 24 and 25. The flip-flop 2 has four set input terminals 11, 12, 13 and 14, four reset input terminals 15, 16, 17 and 18, a set output terminal 21, a reset output terminal 22 and two clock pulse input terminals 26 and 27. A clock pulse oscillator OSC provides clock pulses to a lead 23. The clock pulses provided by the clock pulse oscillator have a repetition rate or frequency of, for example, 1 megacycle per second. The lead 23 is connected to the clock pulse input terminals 24 and 25 of the flip-flop 1 and the clock pulse input terminals 26 and 27 of the flip-flop 2.

The input terminal 82 is an adding input terminal and the input terminal 83 is a subtracting input terminal, as indicated in FIG. 10. When the flip-flop 1 is in its reset condition, a 0, or ±6 volts, appears at its set output terminal 19 and a signal 1, or 0 volts, is provided at its reset output 20. When the flip-flop 1 is in its set condition, a signal 1 is provided at its set output 19 and 0 is provided at its reset output 20. The flip-flops 1 and 2 function in the manner described with reference to FIG. 9B.

If it is assumed that both flip-flops 1 and 2 are in their reset condition, if a pulse, or signal 1, is supplied to the input terminal 82, a signal 1 is supplied to the set input terminals 3 and 4 of the flip-flop 1. When a clock pulse is then supplied, the flip-flop 1 is reset. The flip-flop 2 remains in its reset condition as long as a pair of AND gates 28 and 29 are in their nonconductive condition. The counter thus counts or stores a 1.

If a second pulse, or signal 1, is supplied to the input terminal 82, a signal 1 is supplied to the reset inputs 9 and 10 of the flip-flop 1 and the set inputs 11 and 12 of the flip-flop 2. When a clock pulse is then supplied, the flip-flop 1 is reset and the flip-flop 2 is set. The counter has then stored or counted two pulses. If a third pulse, or signal 1, is supplied to the input terminal 82, when the flip-flop 1 is in its reset condition and the flip-flop 2 is in its set condition, a signal 1 is supplied to the set input terminals 3 and 4 of the flip-flop 1 and said flip-flop 1 is set. The flip-flop 2 remains in its set condition. At such point, three pulses have been stored or counted in the counter.

If a pulse, or signal 1, is then supplied to the input terminal 83, a signal 1 is supplied to the reset inputs 7 and 8 of the flip-flop 1 and said flip-flop is reset. Thus, since one pulse is subtracted, only two pulses remain stored or counted in the counter. In the aforedescribed manner, each time a pulse is supplied to the adding input terminal 82, a 1 is added to the content of the reversible counter, and each time a pulse is supplied to the subtracting input terminal 83, a 1 is subtracted from the content of said counter.

FIG. 13, which is the combination of FIGS. 13A and 13B, explains, in greater detail, the bidirectional pulse control circuit of the present invention, as shown in FIG. 10. In FIG. 13, and more specifically in FIG. 13A, the selective circuit MIX and its operation have been described with reference to FIG. 10. The reversible counter RC comprises 10 flip-flops, as shown in FIG. 13B. The counter RC comprises the flip-flops F0, F1, F2, F3, F4, F5, F6, F7, F8 and F9. The reversible counter RC thus has a capacity of $2^{10}$.

The set output terminals of the flip-flops F0 to F9 of the reversible counter RC correspond to the digits $2^0$, $2^1$, $2^2$, $2^3$, $2^4$, $2^5$, $2^6$, $2^7$, $2^8$ and $2^9$ in binary numbers. If the content of the reversible counter RC is 5, for example, which is 101 in binary numbers, an output signal 1 is provided at only the set output terminals T0 and T2. The flip-flops F0 to F9 have set output terminals T0, T1, T2, T3, and so on, to T9. The set outputs T0 to T9 are connected to the inputs T25, T24, T23, T22, T21, T20, T19, T18, T17 and T16, respectively, of the digital-to-analog converter DAC via a bus B1.

In order to determine whether the content of the reversible counter RC is zero or not, the set outputs T0 to T9 are also connected to a detecting circuit DDC via the bus B1. The detecting circuit DDC comprises a plurality of OR gates OR1, OR2, OR3, OR4, OR5, OR6 and OR7. If the content of the reversible counter RC is not zero, a 1 is provided at at least one of the outputs T0 to T9, so that a 1 is provided at an output lead 101 of the detecting circuit DDC.

Pulses provided by the variable frequency oscillator VO are provided at its output terminal 140 and are supplied to a circuit comprising an inverter 141 and a pair of flip-flops F10 and F11. The circuit functions in the same manner as the flip-flops 107 and 108 of FIG. 10 and the inverter 110 of said FIG. Thus, each time the variable frequency oscillator VO provides an output pulse, an output pulse having a duration of one period of the clock pulses may be provided at the reset output 142 of the flip-flop F11 at the leading edge of the output pulse provided by said oscillator.

If the content of the reversible counter RC is not zero, a 1 is provided in the output lead 101, so that the pulse provided at the output terminal 142 of the flip-flop F11 is supplied to the output lead 104 via the AND gate AG1. The pulse transferred by the AND gate AG1 is supplied to the output terminals 84 and 85 via one of the AND gates AG2 and AG3.

One-shot or monostable multivibrators OM1 and OM2 are connected to the output terminals 84 and 85, respectively. The multivibrators OM1 and OM2 provide pulse shaping in a known manner.

FIG. 14 illustrates the digital-to-analog converter. As described with reference to FIG. 13B, the outputs T0, T1, T2, T3, T4, T5, T6, T7, T8 and T9 of the reversible counter RC are connected to the input terminals T25, T24, T23, T22, T21, T20, T19, T18, T17 and T16 of the detecting circuit DDC. The input terminal T16 is connected to the base electrode of a transistor Q1 via a resistor R1. The input terminal T17 is connected to the base electrode of a transistor Q2 via a resistor R2. The input terminal T18 is connected to the base electrode of a transistor Q3 via a resistor R3. The input terminal T19 is connected to the base electrode of a transistor Q4 via a resistor R4. The input terminal T20 is connected to the base electrode of a transistor Q5 via a resistor R5. The input terminal T21 is connected to the base electrode of a transistor Q6 via a resistor R6. The input terminal T22 is connected to the base electrode of a transistor Q7 via a resistor R7. The input terminal T23 is connected to the base electrode of a transistor Q8 via a resistor R8. The input terminal T24 is connected to the base electrode of a transistor Q9 via a resistor R9. The input terminal T25 is connected to the base electrode of a transistor Q10 via a resistor R10. Each of the resistors R1 to R10 has the same resistance value.

The base electrodes of the transistors Q1 to Q10 are connected to a negative voltage power source of −12 volts via resistors R21, R22, R23, R24, R25, R26, R27, R28, R29 and R30, respectively. Each of the resistors R21 to R30 has the same resistance value. The emitter electrodes of the transistors Q1 to Q10 are connected in common to a 0 voltage lead. The collector electrodes of the transistors Q1 to Q10 are connected a positive voltage power source of +24 volts via resistors R11, R12, R13, R14, R15, R16, R17, R18, R19 and R20. Each of the resistors R11 to R20 has the same resistance value.

One end of each of a plurality of resistors R31, R32, R33, R34, R35, R36, R37, R38, R39 and R40 is connected to the collector electrode of the transistors Q1, Q2, Q3, Q4, Q5, Q6, Q7, Q8, Q9 and Q10, respectively. The other ends of the resistors R31 to R40 are connected in common to a terminal FC. The resistance value of the resistor R39 is one-half that of the resistor R40. The resistance value of the resistor R38 is one-half that of the resistor R39. The resistance value of the resistor R37 is one-half that of the resistor R38, and so on, until the resistance value of the resistor R31, which is one-half that of the resistor R32.

If the content of the reversible counter RC of FIG. 13 is 0, or +6 volts, is supplied to the input terminals T25 to T16 of the digital-to-analog converter of FIG. 14 and all of the transistors Q10 to Q1 are switched to their conductive condition. Consequently, the resistors R40 to R31 have the minimum combined resistance value. If the content of the reversible counter RC becomes 1, only the transistor Q10 is switched to its nonconductive condition. If the content of the counter RC becomes 2, only the transistor Q9 is switched to its nonconductive condition. If the content of the counter RC becomes 3, both transistors Q10 and Q9 are switched to their nonconductive condition. Each time the content of the counter RC increases, various ones of the transistors Q10 to Q1 are switched to their nonconductive or conductive conditions and the combined resistance values of the resistors R40 and R31 which are connected to those of said transistors which are in their conductive condition becomes large in proportion to the content of said counter.

The output terminal FC of the digital-to-analog converter is connected to the input of the variable frequency oscillator, a circuit of which is shown in FIG. 15, so that said output terminal FC of FIG. 14 is the input terminal of FIG. 15. A voltage proportional to the content of the reversible counter RC is provided at the terminal FC.

FIG. 15 is a circuit diagram of a variable frequency pulse oscillator. If a positive potential is provided in the input terminal FC, and the emitter electrode of the transistor Q151 has a positive potential, a transistor Q152 is switched to its conductive condition and collector current flows through the primary winding L1 of a transformer connected in the collector and base circuits of the transistor Q152. The transistor Q151 is connected as an emitter follower circuit. At such time, a voltage is produced in the secondary winding L2 of the transformer and results in an increase in base potential and a rapid increase in collector current of the transistor Q152.

When the base potential of the transistor Q152 approaches its collector potential, the base current increases and the collector current begins to decrease. If the collector current decreases, a voltage is produced in the secondary winding L2 which results in decrease of the base potential of the transistor Q152, so that the collector current of said transistor decreases further. The collector current of the transistor Q152 consequently rapidly decreases to zero and said transistor is switched to its nonconductive condition.

When the transistor Q152 is in its nonconductive condition, an electrical charge stored in capacitors C152 and C151 is discharged via a resistor R156. As the discharge of the capacitors C152 and C151 continues, the base electrode of the transistor Q152 becomes more positive in potential and said transistor is switched to its conductive condition. The greater the resistance value of the capacitive resistance R156 of the capacitors C151 and C152, the longer the period of conductivity and nonconductivity of the transistor Q152. The larger the positive potential of the emitter electrode of the transistor Q152, the smaller the period of conductivity and nonconductivity of the transistor Q152.

The output is provided via the tertiary winding L3 of the transformer and output pulses are supplied to an output terminal T151 connected to the collector electrode of a transistor Q153. The relation between the content of the reversible counter RC and the frequency of the output pulses of the variable frequency oscillator, as described with reference to FIG. 15, may be regulated or adjusted by providing additional capacitors C153 and C154. A selector switch S1 is provided to connect the additional capacitors C153 and C154 into the circuit thereby varying the capacity. This may also be accomplished by the adjustment of variable resistors RV1 and RV2.

FIG. 16 is a circuit diagram of the flip-flop of FIG. 9D. The terminals A, B, C, D, E, F, G and H of FIG. 16 correspond to the same terminals of FIG. 9D. A voltage of −12 volts is ordinarily applied to the reset terminal RE. A voltage of 0 volts corresponds to the logical signal 1 and a voltage of +6 volts corresponds to the logical signal 0. If it is assumed that the flip-flop of FIG. 16 is in its reset condition, a transistor Q162 is in its conductive condition and a transistor Q161 is in its nonconductive condition, and +6 volts is provided at the terminal G. 0 volts is provided at the terminal H. The base potential of the transistor Q162 is then positive and the base potential of the transistor Q161 is zero, so that the reset condition of the flip-flop is maintained.

If a 1 signal, or voltage of 0 volts, is applied to the terminals A, B and E, a voltage of 0 volts is applied to the base electrode of the transistor Q162 via diodes D161, D162, D163, D164 and D165. The transistor Q162 is switched to its nonconductive condition and the collector potential of the transistor Q162 consequently becomes +6 volts and a positive potential is applied to the base electrode of the transistor Q161 via a parallel circuit of a resistor R167 and a capacitor C161. The transistor Q161 is switched to its conductive condition. A 1 signal, or 0 volts, is thus provided at the output terminal G and a 0, or +6 volts, is provided at the output terminal H, and the flip-flop is set. If 0 volts is then applied to the terminals C, D and F, the transistor Q161 is switched to its nonconductive condition. The transistor Q162 is consequently switched to its conductive condition and +6 volts is provided at the output terminal G. 0 volts is provided at the output terminal H and the flip-flop is reset.

FIG. 17 is a circuit diagram of the flip-flop of FIG. 9E. The terminals A to H and J to M of FIGS. 9E and 17 are the same. It is assumed that a transistor Q171 is nonconductive and a transistor Q172 is conductive. If 0 volts is applied to terminals A, B and J, or to terminals C, D and K, the transistor Q172 is switched to its nonconductive condition and the transistor Q171 is switched to its conductive condition. If 0 volts is then applied to the terminals E, F and K or G, H and J, the transistor Q171 is switched to its nonconductive condition and the transistor Q172 is switched to its conductive condition. It is thus evident that the function described with reference to FIG. 9E is accomplished by the circuit of FIG. 17.

FIGS. 18, 19, 20, 21, 22 and 23 relate to two other embodiments of the variable frequency oscillator V0 of the pulse control circuit of the present invention. FIG. 18 shows another embodiment of the variable frequency oscillator of the present invention in block form and FIG. 19 is the circuit arrangement for the block diagram of FIG. 18. In FIG. 18, a register 22 stores digital information, or command or control pulses, which information is equivalent to that of the reversible counter RC, as aforedescribed. The value stored in the register is supplied to a digital resistor converter 24 via leads 23. The digital resistor converter 24 selects a resistance value corresponding to the value stored in the register 22.

The digital resistor converter 24 has an output lead 25 which is connected to the emitter electrode of a unijunction transistor oscillator 26, described hereinafter in detail. An output pulse train from the unijunction transistor oscillator 26 is supplied via a lead 27 to the input of a wave-shaping amplifier circuit 28. The output of the wave-shaping amplifier circuit 28 is provided at an output terminal 29. In the embodiment of FIG. 18, the register 22 may comprise a reversible counter which stores series command pulses.

In FIG. 19, digital information is supplied to the register 302 via an input terminal 301. The digital information or command or control pulses are stored in the register 302 as pure binary numbers. Since all the output leads of the register 302 are indicated as a single unit 303, the individual leads are indicated as $LL2^0$, $LL2^1$, $LL2^2$, $LL2^3$, .... $LL2^{n11}$, $LL2^n$ for the digits. The output leads $LL2^0$ to $LL2^n$ correspond to the binary numbers $2^0$, $2^1$, $2^2$, $2^3$, .... $2^{n11}$ and $2^n$, respectively.

The digital resistor converter 304 comprises NPN type transistors QQ0, QQ1, QQ2, QQ3, .... QQn−1, QQn corresponding to the output leads $LL2^0$, $LL2^1$, .... $LL2^n$ of the register 302. The base electrodes of the transistors QQ0 .... QQn are connected to the output leads $LL2^0$ .... $LL2^n$, respectively, via resistors RL0, RL1, RL2, .... RLn−1, RLn, respectively. The resistors RL0 to RLn each have the same resistance value.

The base electrodes of the transistors QQ0 to QQn are also connected to a negative voltage power source terminal 310 of −12 volts via biasing resistors RL20, RL21, .... RL2n−1, RL2n, respectively. Each of the resistors RL20 to RL2n has the same resistance value. The collector electrodes of the transistors QQ0 to QQn are connected to a positive voltage power source terminal 308 or +16 volts via resistors RL30, RL31, .... RL3n−1, RL3n, respectively. The emitter electrodes of the transistors QQ0 to QQn are connected in common to a 0 volt terminal 309 via a lead 312. A series circuit comprising a diode DL0 and a resistor RL40 are connected between the collector electrode of the transistor QQ0 and the output lead 314 of the digital resistor converter 304. A series circuit comprising a diode DL1 and a resistor RL41 are connected between the collector electrode of the transistor QQ1 and the output lead 314 of the digital resistor converter 304, and so on, through the series circuit connection of the diode DLn and the resistor RL4n between the collector electrode of the transistor QQn and the output lead 314.

The output lead 314 of the digital resistor converter 304 is connected to the emitter electrode of the unijunction transistor UQ5 which functions as the unijunction transistor oscillator 305. One base electrode B2 of the unijunction transistor UQ5 is connected to a lead 311 via a resistor UR5. The other base electrode B1 of the unijunction transistor UQ5 is connected to a lead 312 via a resistor UR6. A capacitor UC1 is connected between the emitter electrode E and the lead 312. The base electrode B1 is connected to the base electrode of a transistor UQ6 in the wave-shaping amplifier circuit 306 via an output lead 315.

The emitter electrode of the transistor UQ6 of the wave-shaping amplifier circuit 306 is connected to a lead 313 and the collector electrode of said transistor is connected to the lead 311 via a resistor UR7. The collector electrode of the transistor UQ6 is also connected to the base electrode of a transistor UQ7 via a resistor UR8. The emitter electrode of the transistor UQ7 is connected to the lead 313 and the collector electrode of said transistor is connected to the output terminal 307 and to the lead 311 via a resistor UR9.

In the circuit of FIG. 19, 0 volts corresponds to the logical signal 1 and +16 volts corresponds to the logical signal 0. The resistance values of the resistors RL40 to RL4n and RL30 to RL3n are determined so that the relationship between said resistors may be expressed, for example, as RL30+RL40=$(2^n)$(10)kilohms RL31+RL41=$(2^{n-1})$(10)kilohms

.
.
.

RL3n−1+RL4n−1 = 10 kilohms
RL3n+RL4n=$(2^0)$(10)kilohms

Thus, the sum of the resistance values of a pair of resistors corresponding to a transistor in one digit may become one-half the sum of the resistance values of a pair of resistors corresponding to a transistor in the digit immediately preceding said one digit. In other words, the sum of the resistance values of the pair of resistors RL30 and RL40 corresponding to the transistor QQ0 connected to the lowest digit $LL2^0$ of the register 302 is the maximum and the sum of the resistance values of the pair of resistors RL31 and RL41 corresponding to the transistor QQ1 is one-half of such sum, and so on.

The digital information is stored in the register 302 of FIG. 19 as a pure binary number. The voltage signals or 0 volts or +16 volts are provided at the output terminals of said register as a plurality of digits corresponding to said binary number. If the numerical value stored in the register 302 is 5 in decimal numbers, a voltage 0 volts is provided at only the output leads $LL2^0$ and $LL2^2$. When the logical signal 0, or +16 volts, is provided at all the output leads $LL2^0$ .... $LL2^n$ of the register 302, all of the transistors QQ0 to QQn are switched to their conductive condition. When a logical 1 signal is provided in some of the output leads $LL2^0$ to $LL2^n$, only those of the transistors QQ0 to QQm which are connected to output lines providing 0 volts are switched to their conductive condition and the diodes DL0 to DLn are reverse biased, so that the resistors RL40 to RL4n are cut off.

When the register 302 is full, so that only the transistors QQ0 to QQn are in their nonconductive condition, the collector potentials of said transistors are increased and positive bias is applied to the diodes DL0 to DLn. Consequently, the resistors RL30 to RL3n are connected in series with the corresponding resistors RL40 to RL4n. At this time, the combined resistance R may be expressed as $$R = \frac{1}{RL30+RL40} + \frac{1}{RL31+RL41} + \frac{1}{RL3n-1+RL4n-1}$$
$$+ \frac{1}{RL3n+RL4n}$$

(1)

If the resistance values of the resistors RL30 to RL3n and RL40 to RL4n are set at the aforedescribed magnitudes, the combined resistance value of the leads 311 and 314 is correctly inversely proportional to the binary numerical value stored in the register 302.

The unijunction transistor oscillator functions in a manner whereby the capacitor UC1 is charged via the lead 311. The resistance circuit and the lead 314 and the emitter potential of the unijunction transistor UQ5 begin to increase. When the emitter potential reaches the potential of the base electrode B2, +16 volts, the unijunction resistor is switched to its conductive condition. The electrical charge stored in the capacitor UC1 is discharged via the base electrode B1 and the resistor UR6. When the potential of the emitter E decreases rapidly to about +2 volts, the unijunction transistor UQ5 is switched to its nonconductive condition and the capacitor UC1 commences to recharge.

The period of the unijunction transistor oscillator 305 may be expressed as $$T \doteq 2.3RC \log_{10}\left(\frac{1}{1-w}\right) \quad (2)$$

wherein R is the resistance value, C is the capacitance value and w is the parameter determined by the type of unijunction transistor. Thus, the period of oscillation of the oscillator 305 is not related to voltage and temperature and conversion of excellent linearity may be provided directly by digital variation of the resistance value or capacitance value. Each time the unijunction resistor QU5 is switched to its conductive condition, a positive voltage is provided in the lead 315. The voltage in the lead 315 is applied to the amplifying transistor UQ6 of the wave-shaping amplifier circuit 306. The output pulses are provided at the output terminal 307.

FIG. 20 illustrates the waveforms of potentials provided in the emitter E and the base B1 of the unijunction transistor UQ5 of FIG. 19 and the waveforms of the collector potential of the transistor UQ7 of FIG. 19. The curve 20a shows the waveform of the emitter potential of the unijunction transistor UQ5. When the emitter potential reaches +16 volts, it is rapidly decreased when the unijunction transistor is switched to its conductive condition and decreases to about +2 volts. The emitter potential then begins to increase again and the cycle repeats.

The curve 20b of FIG. 20 shows the waveform of the potential of the base B1 of the unijunction transistor UQ5. Each time the unijunction transistor is switched to its conductive condition, a positive potential of about 0.8 volt is provided. The curve 20c of FIG. 20 shows the waveform of the collector potential of the shaping transistor UQ7. Each time the potential of the base B1 of the unijunction transistor UQ5 increases, the collector potential of the transistor UQ7 increases from 0 volts to +16 volts.

FIG. 21 is a block diagram of another embodiment of the variable frequency oscillator of the pulse control circuit of the present invention. The embodiment of FIG. 21 differs from that of FIG. 18 by utilizing a digital capacitor converter for converting digital information of the register 502 to the corresponding capacitance value. Furthermore, the period of oscillation of the unijunction transistor oscillator 506 is controlled by the digital capacitor converter 504. In FIG. 21, digital information is supplied to the input of the register 502 via an input terminal 501. The digital information is supplied from the register 502 to the digital capacitor converter 504 via leads 503.

In accordance with the digital information from the register 502, the digital capacitor converter 504 modifies the period of oscillation of the unijunction transistor oscillator 506 via a lead 505. The output of the unijunction transistor oscillator 506 is supplied to the wave shaping amplifier circuit 508 via a lead 507. The shaped output of the oscillator 506 is amplified and applied to an output terminal 509.

FIG. 22 is the circuit diagram of the block diagram of FIG. 21. The embodiment of FIG. 22 is similar to that of FIG. 19, since the output leads $LL2^0$, $LL2^1$, .... $LL2^{n11}$, $LL2^n$ of a plurality of digits stored in the register 602 are connected to the base electrodes of the transistors QQ10, QQ11, QQ12, .... QQ1$n$−1, QQ1$n$, respectively. The embodiments of FIGS. 22 and 19 differ from each other, since in FIG. 22, a series circuit comprising a diode DL02 and a capacitor CL20 are connected between the collector electrode of the transistor QQ10 and the output lead 614. A diode DL01 is connected between the emitter electrode of the transistor QQ10 and the capacitor CL20. The same circuitry is provided for the other transistors QQ11 to QQ1$n$. The emitter electrode E of the unijunction transistor UQ8 of the unijunction transistor oscillator 605 is connected to the lead 611 via a resistor UR10 and is also connected to the lead 612 via a capacitor UC3. The lead 614 is connected between the emitter electrode E of the unijunction transistor UQ8 and the capacitors CL20 to CL2$n$ in common.

Input digital information stored in the register 602 provides potentials of 0 volts or +16 volts to the transistors QQ10 to QQ1$n$ via resistors RL50 to RL5$n$, respectively, in accordance with whether the digits have the logical value 1 or 0. Those of the transistors QQ10 to QQ1$n$ which are supplied with a logical signal 1, or 0 volts, are switched to their nonconductive condition and those of said transistors to which a logical signal 0, or +16 volts, is supplied are switched to their conductive condition. If it is assumed that the transistors QQ10 to QQ1$n$ are in their nonconductive condition, the diodes DL02, DL12, .... DL$n$−12, DL$n$2 are reverse biased and are made nonconductive. The corresponding capacitors CL20, CL21, .... CL2$n$−1, CL2$n$ are thus cut off from the lead 612.

If the transistors QQ10 to QQ1$n$ are in their conductive condition, the diodes DL02, DL12, .... DL$n$2 are made conductive and the capacitors CL20 to CL2$n$ are charged via the lead 611, the resistor UR10 and the lead 614. Thus, when the emitter potential of the unijunction transistor UQ8 reaches the supply voltage of +16 volts, the electrical charge stored in the capacitors CL20 to CL2$n$ is discharged via the base electrode B1 of said unijunction transistor, a resistor UR12 and the diodes DL01, DL11, DL$n$−11, DL$n$1.

The combined capacitance C which determines the period of oscillations of the unijunction transistor oscillator may be expressed as $$C = CL20 + CL21 + \ldots CL2n{-}1 + CL2n + UC3 \quad (3)$$

The capacitance of the capacitors CL20 to CL2$n$ may be expressed as follows, utilizing the capacitance value C20 of the capacitor CL20 as the reference.

$C20 = (2^0)C20$
$C21 = (2^1)C20$ $$\cdot \quad (4)$$

$C2n{-}1 = (2^{n11})C20$
$C2n = (2^2)C20$

The period of oscillation T of the unijunction transistor oscillator 605 may be express as $$T \doteq 2.3R10(C20 + C21 + \ldots C2n-1 + C2n)$$
$$+ UC3\sqrt{\log_{10}\left(\frac{1}{1-w}\right)}$$
$$(5)$$

FIG. 23 illustrates the frequency characteristic of the variable frequency oscillator of FIG. 22. In FIG. 23, the abscissa corresponds to the value S of the digital input and the ordinate corresponds to the output frequency $f$ in pulses per second. As indicated by FIG. 23, conversions may be accomplished at an output frequency of 15,000 pulses per second producing a relatively excellent result having a precision of within about 2 percent.

Although the pulse motor has hereinbefore been described as a type of step motor, it is evident that the step motor control system of the present invention may be utilized with all types of step motors which step in response to command or control pulses. As hereinbefore described, in accordance with the present invention, even when the frequency or pulse duration of a command or control pulse train provided by the control unit changes rapidly, or when the command pulse train is provided as an interrupted pulse train of extremely high constant frequency, the frequency of the pulse train supplied to the step motor is not rapidly changed, but increases or decreases gradually so that the step motor responds correctly and the load is protected from sudden impact by the motor. Furthermore, by proper adjustment of the relationship between the content of the reversible counter of the pulse control circuit and the oscillation frequency of the variable frequency oscillator, the most suitable relation for load condition and stable control of the step motor may be provided.

While the invention has been described by means of specific examples and in specific embodiments, we do not wish to be limited thereto, for obvious modifications will occur to those skilled in the art without departing from the spirit and scope of the invention.

We claim:

1. A step motor control system for controlling a step motor or the like, said system comprising pulse supply means for supplying a train of control pulses to a step motor; and pulse control means connected between said pulse supply means and said step motor for gradually increasing the frequency of pulses in the beginning of said pulse train and gradually decreasing the frequency of pulses in the end of said pulse train thereby enabling proper starting and stopping of said motor when said motor operates at high speed, said pulse control means comprising reversible counter means having inputs and outputs for storing the control pulses supplied thereto, input means for supplying said train of control pulses to an input of said reversible counter means for storage therein, variable frequency oscillator means coupled to an output of said reversible counter means for providing pulses having a frequency proportional to the content of said reversible counter means, output means, AND gate means having an input connected to said variable frequency oscillator means for receiving said pulses from said variable frequency oscillator means, an input connected to said reversible counter means for receiving a nonzero signal from said reversible counter means and an output connected to said output means, and feedback means connected between said output means and said reversible counter means for transferring pulses to said reversible counter means as negative feedback pulses in a manner whereby each feedback pulse subtracts from the content of said reversible counter means.

2. A step motor control system as claimed in claim 1, wherein said pulse control means further comprises means for adjusting the ratio of the content of the reversible counter means to the frequency of the pulses provided by said variable frequency oscillator means.

3. A step motor control system as claimed in claim 1, wherein said pulse control means further comprises a digital-to-analog converter connected between said reversible counter means and said variable frequency oscillator means for converting the content of said reversible counter means to an output voltage proportional thereto.

4. A step motor control system as claimed in claim 1, wherein said pulse control means further comprises a digital register converter connected between said reversible counter means and said variable frequency oscillator means for converting the content of said reversible counter means to the resistance value corresponding thereto.

5. A step motor control system as claimed in claim 1, wherein said pulse control means further comprises a digital capacitor converter connected between said reversible counter means and said variable frequency oscillator means for converting the content of said reversible counter means to the capacitance value corresponding thereto.

6. A step motor control system as claimed in claim 1, wherein said pulse control means further comprises selective circuit means connected between said input means and said reversible counter means for determining to which of the inputs of said reversible counter means negative and positive control pulse trains are supplied.

7. A step motor control system as claimed in claim 6, wherein said pulse control means further comprises additional AND gate means having inputs connected to the output of said AND gate means and to outputs of said selective circuit means, said additional AND gate means having a positive output and a negative output, and said selective circuit means determining to which of the positive and negative output of said additional AND gate means the pulses provided by said variable frequency oscillator means are supplied.